(12) United States Patent
Kumazaki et al.

(10) Patent No.: US 10,604,022 B2
(45) Date of Patent: Mar. 31, 2020

(54) VEHICLE CONTROL APPARATUS

(71) Applicant: TOYOTA JIDOSHA KABUSHIKI KAISHA, Toyota-shi, Aichi (JP)

(72) Inventors: Kenta Kumazaki, Anjo (JP); Tooru Matsubara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 209 days.

(21) Appl. No.: 15/725,774

(22) Filed: Oct. 5, 2017

(65) Prior Publication Data

US 2018/0099580 A1 Apr. 12, 2018

(30) Foreign Application Priority Data

Oct. 12, 2016 (JP) .................................. 2016-201356

(51) Int. Cl.
*B60L 15/20* (2006.01)
*B60K 6/547* (2007.10)
(Continued)

(52) U.S. Cl.
CPC .............. *B60L 15/20* (2013.01); *B60K 6/365* (2013.01); *B60K 6/445* (2013.01); *B60K 6/547* (2013.01);
(Continued)

(58) Field of Classification Search
CPC ........ B60L 15/20; B60L 7/14; B60L 15/2045; B60L 2240/14; B60L 2240/421;
(Continued)

(56) References Cited

U.S. PATENT DOCUMENTS

2007/0216312 A1 9/2007 Ogata et al.
2009/0029825 A1 1/2009 Matsubara et al.
(Continued)

FOREIGN PATENT DOCUMENTS

JP 2003-329123 A 11/2003
JP 2005-162203 A 6/2005
(Continued)

*Primary Examiner* — Paula L Schneider
(74) *Attorney, Agent, or Firm* — Oliff PLC

(57) ABSTRACT

A control apparatus for an electric vehicle provided with an electric motor serving as a drive power source, and a step-variable transmission disposed in a power transmitting path between the electric motor and drive wheels, the control apparatus having a first control mode in which acceleration and deceleration of the vehicle are controlled on the basis of operations by an operator of the vehicle to accelerate and decelerate the vehicle, and a second control mode in which the acceleration and deceleration of the vehicle are automatically adjusted according to a target running state of the vehicle, irrespective of the operations of the operator, the control apparatus including a shift-down action initiating condition setting portion configured to set a shift-down action initiating condition for initiating a shift-down action of the step-variable transmission during a regenerative decelerating run of the vehicle, according to a torque-related value related to a regenerative torque generated by the electric motor, and a running speed of the vehicle. The shift-down action initiating condition setting portion sets the shift-down action initiating condition such that the shift-down action is initiated at a higher value of the running speed of the vehicle during the regenerative decelerating run in the second control mode, than in the first control mode.

9 Claims, 13 Drawing Sheets

(51) Int. Cl.
*B60W 10/18* (2012.01)
*B60W 10/20* (2006.01)
*B60K 6/365* (2007.10)
*B60K 6/445* (2007.10)
*B60W 50/00* (2006.01)
*B60W 10/08* (2006.01)
*B60W 10/115* (2012.01)
*B60W 30/02* (2012.01)
*B60W 30/18* (2012.01)
*B60W 20/30* (2016.01)
*B60W 20/15* (2016.01)
*B60L 7/14* (2006.01)
*B60W 30/14* (2006.01)

(52) U.S. Cl.
CPC .............. *B60L 7/14* (2013.01); *B60L 15/2045* (2013.01); *B60W 10/08* (2013.01); *B60W 10/115* (2013.01); *B60W 10/18* (2013.01); *B60W 10/20* (2013.01); *B60W 20/15* (2016.01); *B60W 20/30* (2013.01); *B60W 30/025* (2013.01); *B60W 30/18127* (2013.01); *B60W 50/0098* (2013.01); *B60L 2240/14* (2013.01); *B60L 2240/421* (2013.01); *B60L 2240/423* (2013.01); *B60L 2250/26* (2013.01); *B60L 2260/26* (2013.01); *B60W 30/14* (2013.01); *Y02T 10/6239* (2013.01); *Y02T 10/645* (2013.01); *Y02T 10/72* (2013.01); *Y02T 10/7283* (2013.01)

(58) Field of Classification Search
CPC ........... B60L 2240/423; B60L 2250/26; B60L 2260/26; B60W 20/15; B60W 10/08; B60W 10/115; B60W 10/18; B60W 10/20; B60W 20/30; B60W 30/025; B60W 30/18127; B60W 50/0098; B60W 30/14; B60K 6/365; B60K 6/445; B60K 6/547; Y02T 10/6239; Y02T 10/645; Y02T 10/72; Y02T 10/7283
USPC ........................................................ 701/22
See application file for complete search history.

(56) References Cited

U.S. PATENT DOCUMENTS

2012/0077638 A1\* 3/2012 Kumazaki .............. B60K 6/445 477/5
2015/0307099 A1 10/2015 Dextreit et al.
2016/0059840 A1 3/2016 Nefcy et al.

FOREIGN PATENT DOCUMENTS

| JP | 2007-245805 | A | 9/2007 |
| JP | 2009-23614 | A | 2/2009 |
| JP | 2016-506713 | A | 3/2016 |
| JP | 2016-175491 | A | 10/2016 |
| WO | 2010/137123 | A1 | 12/2010 |

\* cited by examiner

FIG.2

| | C0 | C1 | C2 | B0 | B1 | B2 | B3 | SPEED RATIO | STEPPING RATIO |
|---|---|---|---|---|---|---|---|---|---|
| 1st | ◎ | ○ | | | | | ○ | 3.357 | |
| | | | | | | | | | 1.54 |
| 2nd | ◎ | ○ | | | | ○ | | 2.180 | |
| | | | | | | | | | 1.53 |
| 3rd | ◎ | ○ | | | ○ | | | 1.424 | |
| | | | | | | | | | 1.42 |
| 4th | ◎ | ○ | ○ | | | | | 1.000 | |
| | | | | | | | | | 1.42 |
| 5th | | ○ | ○ | ◎ | | | | 0.705 | |
| | | | | | | | | | GEAR RATIO SPREAD |
| R | | | ○ | | | | ○ | 3.209 | |
| N | | | | | | | | | 4.76 |

○ ENGAGED   ◎ ENGAGED FOR STEP-VARIABLE SHIFTING, AND RELEASED FOR CONTINUOUSLY-VARIABLE SHIFTING

FIG.13

|  | C1 | C2 | C3 | C4 | B1 | B2 |
|---|---|---|---|---|---|---|
| 1st | ○ |  |  |  |  | ○ |
| 2nd | ○ |  |  |  | ○ |  |
| 3rd | ○ |  | ○ |  |  |  |
| 4th | ○ |  |  | ○ |  |  |
| 5th | ○ | ○ |  |  |  |  |
| 6th |  | ○ |  | ○ |  |  |
| 7th |  | ○ | ○ |  |  |  |
| 8th |  | ○ |  |  | ○ |  |
| R1 |  |  | ○ |  |  | ○ |
| R2 |  |  |  | ○ |  | ○ |

○ : ENGAGED

VEHICLE CONTROL APPARATUS

INCORPORATION BY REFERENCE

The disclosure of Japanese Patent Application No. 2016-201356 filed on Oct. 12, 2016 including the specification, drawings and abstract is incorporated herein by reference in its entirety.

FIELD OF THE INVENTION

The present invention relates to a vehicle control apparatus having a control mode in which acceleration and deceleration (braking) of a vehicle are automatically adjusted, not depending upon operations by an operator of the vehicle to accelerate and decelerate (brake) the vehicle.

BACKGROUND OF THE INVENTION

There is known a control apparatus for an electric vehicle provided with an electric motor serving as a drive power source, and a step-variable transmission, where the control apparatus is configured to shift-down the step-variable transmission on the basis of a shift-down initiating condition set on the basis of a running speed of the vehicle and an amount of regeneration of an electric energy by the electric motor during regenerative deceleration of the vehicle in which the electric motor is placed in a regenerative state. WO2010/137123 discloses an example of such a control apparatus. The vehicle disclosed in WO2010/137123 is provided with: an electrically controlled differential portion having a planetary gear set, a first electric motor (differential electric motor) connected to a sun gear of the planetary gear set, and a second electric motor (vehicle driving electric motor) connected to a ring gear of the planetary gear set; and a step-variable automatic transmission portion which is connected to an output rotary member (ring gear) of the electrically controlled differential portion and which is shifted with engaging and releasing actions of coupling elements. This vehicle is arranged such that operating state of the first electric motor is controlled to control a difference between input and output speeds of the planetary gear set, namely, a rotating speed of its input rotary member in the form of a carrier provided to receive a rotary motion of the engine, and a rotating speed of its output rotary member in the form of the ring gear. The vehicle control apparatus of WO2010/137123 is configured to implement a coasting shift-down action of the step-variable automatic transmission portion followed by a regenerative operation of the second electric motor, which coasting shift-down action takes place during a coasting run of the vehicle with its accelerator pedal kept in its non-operated or fully released position. The vehicle control apparatus makes a determination as to whether the coasting shift-down action should be implemented or not, on the basis of a coasting shift-down boundary line of the vehicle speed, which is formulated as a range of coasting shift-down points and such that the vehicle speed above which the coasting shift-down action is implemented increases with an increase of an amount of electric energy regenerated by the second electric motor. This vehicle control apparatus permits the second electric motor to be operated at a relatively high speed in a relatively high region of its regenerative torque, whereby a power loss of the second electric motor during its regenerative operation is reduced, so that power recovery efficiency of the vehicle is improved.

By the way, during regenerative operation of an electric motor in a high region of its regenerative torque during a decelerating run of the vehicle, it is difficult to accurately synchronize operating speed of the motor while controlling the electric motor so as to maintain a desired regenerative braking force upon a shift-down action of the step-variable automatic transmission portion. Accordingly, longitudinal acceleration of the vehicle tends to considerably vary, due to a variation of the regenerative braking force. The vehicle operator tends to feel a higher degree of a shift shock of the step-variable automatic transmission portion in a second control mode (automatic control mode) of the vehicle in which acceleration and deceleration (braking) of the vehicle are automatically adjusted, not depending upon operations by the vehicle operator to accelerate and decelerate (brake) the vehicle, than in a first control mode (manual control mode) of the vehicle in which the vehicle is accelerated and decelerated on the basis of the accelerating and decelerating operations by the vehicle operator, so as to reflect the desire of the vehicle operator. Examples of the second control mode include an auto-cruise control mode; a preceding-vehicle tracing control mode; and a fully automatic vehicle control mode in which acceleration, deceleration (braking) and steering of the vehicle are automatically adjusted not depending upon operations by the vehicle operator. As a result, the vehicle operator may feel a discomfort with the shift-down shock caused by the variation of the longitudinal acceleration of the vehicle upon the shift-down action of the step-variable automatic transmission portion during a regenerative decelerating run of the vehicle in the second control mode in which the vehicle acceleration and deceleration are automatically adjusted not depending upon the vehicle operator's operations.

SUMMARY OF THE INVENTION

The present invention was made in view of the background art described above. It is therefore an object of the present invention to provide a control apparatus for a vehicle provided with a step-variable transmission, which control apparatus permits reduction of a shift-down shock of the step-variable transmission due to a variation of the longitudinal acceleration of the vehicle upon a shift-down action of the step-variable transmission during a regenerative decelerating run of the vehicle in the second control mode in which the acceleration and deceleration (braking) of the vehicle are automatically adjusted not depending upon the operations by the vehicle operator.

The object indicated above is achieved according to the following aspects of the present invention:

According to a first aspect of the invention, there is provided a control apparatus for an electric vehicle provided with an electric motor serving as a drive power source, and a step-variable transmission disposed in a power transmitting path between the electric motor and drive wheels, the control apparatus having a first control mode in which the vehicle is controlled on the basis of operations by an operator of the vehicle to accelerate and decelerate the vehicle, and a second control mode in which the acceleration and deceleration of the vehicle are automatically adjusted according to a target running state of the vehicle, irrespective of the operations by the operator, the control apparatus comprising a shift-down action initiating condition setting portion configured to set a shift-down action initiating condition for initiating a shift-down action of the step-variable transmission during a regenerative decelerating run of the vehicle, according to a torque-related value related to a regenerative torque generated by the electric motor, and a running speed of the vehicle, the shift-down action initiating condition setting portion setting the shift-down action initiating condition such that the shift-down action is initiated at a higher value of the running speed of the vehicle during the regenerative decelerating run in the second control mode, than in the first control mode.

According to a second aspect of the invention, the electric vehicle to be controlled by the control apparatus according to the first aspect of the invention is a hybrid vehicle which further provided with an engine also serving as the drive power source, and a power transmitting/cutoff device operable to disconnect the engine from the power transmitting path. The power transmitting/cutoff device is operated to disconnect the engine from the power transmitting path during the regenerative decelerating run of the vehicle in the second control mode.

According to a third aspect of the invention, the shift-down action initiating condition setting portion according to the first or second aspect of the invention changes the shift-down action initiating condition such that the shift-down action initiates at a higher running speed of the vehicle and that a change amount of the shift-down action initiating condition when the torque-related value is comparatively small is larger than the change amount when the torque-related value is comparatively large, in the second control mode.

According to a fourth aspect of the invention, the control apparatus according to any one of the first through third aspects of the invention is configured such that the second control mode is selected from among an auto-cruise control mode, a preceding-vehicle tracing control mode, and a fully automatic vehicle control mode in which acceleration, deceleration and steering of the vehicle are automatically controlled.

Advantages of the Invention

According to the first aspect of the invention, the electric vehicle to be controlled by the control apparatus is provided with the electric motor serving as a drive power source, and the step-variable transmission disposed in the power transmitting path between the electric motor and the drive wheels, and the control apparatus has the first control mode in which the acceleration and deceleration of the vehicle are controlled on the basis of the operations by the operator of the vehicle to accelerate and decelerate the vehicle, and the second control mode in which the acceleration and deceleration of the vehicle are automatically adjusted according to the target running state of the vehicle, irrespective of the operations by the operator. The control apparatus comprises the shift-down action initiating condition setting portion configured to set the shift-down action initiating condition for initiating the shift-down action of the step-variable transmission during the regenerative decelerating run of the vehicle, according to the torque-related value related to the regenerative torque generated by the electric motor, and the running speed of the vehicle. The shift-down action initiating condition setting portion sets the shift-down action initiating condition such that the shift-down action is initiated at the higher value of the running speed of the vehicle during the regenerative decelerating run in the second control mode, than in the first control mode. According to the first aspect of the invention, therefore, the shift-down action of the step-variable transmission in the second control mode in which the acceleration and deceleration of the vehicle are automatically adjusted not depending upon the operations by the vehicle operator to accelerate and decelerate the vehicle is initiated before an increase of variation of a vehicle braking force as a result of the shift-down action of the step-variable transmission during the regenerative decelerating run of the vehicle, namely, while the amount of variation of the vehicle braking force caused by the shift-down action is held small. Thus, fluctuations in the longitudinal acceleration of the vehicle is reduced during shift-down action. Accordingly, it is possible to reduce a possibility of the vehicle operator feeling a discomfort with a shift-down shock of the step-variable transmission caused by the variation of a longitudinal acceleration G of the vehicle as a result of the shift-down action of the step-variable transmission during the regenerative decelerating run of the vehicle in the second control mode in which the vehicle operator tends to more sensitively feel the shift-down shock.

According to the second aspect of the invention, the electric vehicle is a hybrid vehicle which further provided with the engine also serving as the drive power source, and the power transmitting/cutoff device operable to disconnect the engine from the power transmitting path. The power transmitting/cutoff device is operated to disconnect the engine from the power transmitting path during the regenerative decelerating run of the vehicle in the second control mode. According to the second aspect of the invention, therefore, the amount of variation of the vehicle braking force caused by the shift-down action of the step-variable transmission during the regenerative decelerating run of the vehicle can be reduced by an amount corresponding to an inertia force of the engine, by disconnecting the engine from the power transmitting path during the regenerative operation of the electric motor. Accordingly, it is possible to reduce the possibility of the vehicle operator feeling the discomfort with the shift-down shock of the step-variable transmission caused by the variation of the longitudinal acceleration G of the vehicle as a result of the shift-down action of the step-variable transmission during the regenerative decelerating run of the vehicle in the second control mode in which the vehicle operator tends to more sensitively feel the shift-down shock of the step-variable transmission than in the first control mode.

According to the third aspect of the invention, the shift-down action initiating condition setting portion changes the shift-down action initiating condition such that the shift-down action initiates at a higher running speed of the vehicle and that a change amount of the shift-down action initiating condition when the torque-related value is comparatively small is larger than the change amount when the torque-related value is comparatively large, in the second control mode. According to the third aspect of the invention, therefore, the shift-down action of the step-variable transmission is more easily implemented during the regenerative decelerating run of the vehicle in the second control mode while a regenerative torque of the electric motor is comparatively small. Accordingly, the amount of variation of the longitudinal, acceleration G of the vehicle can be reduced over a comparatively wide range of the running speed of the vehicle. Further, the shift-down action can be initiated with an improved degree of fuel economy of the vehicle while the regenerative torque of the electric motor is comparatively large.

According to the fourth aspect of the invention, the second control mode is selected from among the auto-cruise control mode, the preceding-vehicle tracing control mode, and the fully automatic vehicle control mode in which the acceleration, deceleration and steering of the vehicle are automatically controlled. According to the fourth aspect of the invention, therefore, the amount of variation of the longitudinal acceleration G of the vehicle as a result of the shift-down action of the step-variable transmission during the regenerative decelerating run of the vehicle can be reduced in any one of the auto-cruise control mode, preceding-vehicle tracing control mode and fully automatic vehicle control mode, which is selected as the second control mode. Accordingly, it is possible to reduce the possibility of the vehicle operator feeling the discomfort with the shift-down shock of the step-variable transmission caused by the variation of the longitudinal acceleration G of the vehicle.

BRIEF DESCRIPTION OF THE DRAWINGS

FIG. 2 is a table indicating shifting actions of the vehicular power transmitting system of FIG. 1, which is operable in a continuously-variable or step-variable shifting state, in relation to different combinations of operating states of hydraulically operated frictional coupling devices to implement the respective shifting actions;

FIG. 13 is a table indicating shifting actions of an automatic transmission of the vehicular power transmitting system of FIG. 12, in relation to different combinations of operating states of coupling devices for establishing respective speed positions of the automatic transmission.

DETAILED DESCRIPTION OF PREFERRED EMBODIMENT

Embodiments of the present invention will be described in detail by reference to the drawings.

First Embodiment

Figure 1:
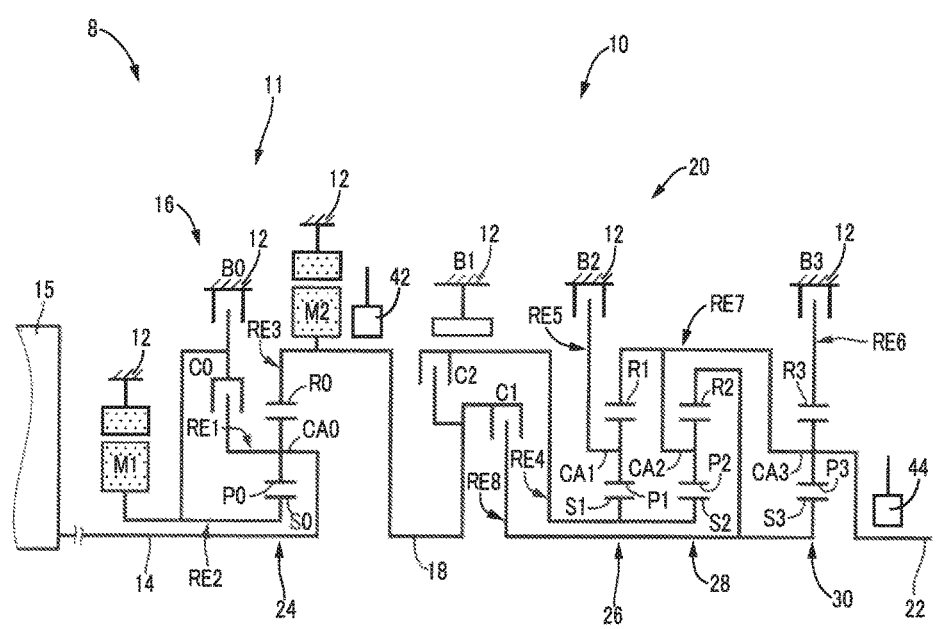
FIG. 1 is a schematic view showing an arrangement of a vehicular power transmitting system to be controlled by a vehicle control apparatus according to the present invention.

A control apparatus according to the present invention is used for a hybrid vehicle, for example. FIG. 1 is the schematic view showing an arrangement of a vehicular power transmitting system 10 (hereinafter referred to as "power transmitting system 10") of a vehicle 8 to be controlled by the vehicle control apparatus of the present invention. As shown in FIG. 1, the power transmitting system 10 includes: an input rotary member in the form of an input shaft 14; a differential portion 11 connected to the input shaft 14 either directly, or via a pulsation absorbing damper (vibration damping device) not shown; an automatic transmission portion 20 which is disposed in a power transmitting path between the differential portion 11 and drive wheels 38 (shown in FIG. 5) of the vehicle 8, and which is connected in series via a power transmitting member (power transmitting shaft) 18 to the differential portion 11 and the drive wheels 38; and an output rotary member in the form of an output shaft 22 connected to the automatic transmission portion 20 or the power transmitting system 10. The input shaft 14, differential portion 11, automatic transmission portion 20 and output shaft 22 are coaxially disposed on a common axis in a transmission casing 12 (hereinafter referred to as "casing 12") functioning as a stationary member attached to a body of the vehicle 8, and are connected in series with each other. This power transmitting system 10 is disposed between an internal combustion engine 15 serving as a drive power source, and the pair of drive wheels 38, to transmit a vehicle drive force from the engine 15 to the pair of drive wheels 38 through a differential gear device (final speed reduction gear) 36 and a pair of drive axles. The vehicle 8 provided with the power transmitting system 10 is typically of an FR (front-engine rear-drive) type in which the engine 15 is longitudinally mounted. The engine 15 may be a gasoline engine or diesel engine and functional as the vehicle drive power source directly connected to the input shaft 14 or via the pulsation absorbing damper not shown. The differential gear device 36 constitutes a part of the power transmitting path. It is noted that a lower half of the power transmitting system 10, which is constructed symmetrically with respect to its axis, is not shown in FIG. 1.

The differential portion 11 includes: a first electric motor M1; a power distributing mechanism 16 functioning as a differential mechanism to which the first electric motor M1 is operatively connected and which is operable to mechanically distribute an output of the engine 15 received by the input shaft 14, to the first electric motor M1 and the power transmitting member 18; and a second electric motor M2 which is rotated with the power transmitting member 18. Each of the first and second electric motors M1 and M2 is a so-called motor/generator having also a function of an electric generator. The first electric motor M1 primarily functions as a differential electric motor for controlling a differential state of the power distributing mechanism 16, while the second electric motor M2 primarily functions as a vehicle driving electric motor serving as a vehicle drive power source operable to produce a vehicle drive force. The first and second electric motors M1 and M2 are connected to each other to supply and receive an electric energy to and from each other. It is noted that the second electric motor M2 corresponds to an electric motor to be controlled by the vehicle control apparatus of the present invention, while the vehicle 8 corresponds to an electric vehicle which is provided with the second electric motor M2 functioning as a drive power source, and which is to be controlled by the vehicle control apparatus of this invention. It is also noted that the vehicle 8 also provided with the engine 15 functioning as another drive power source corresponds to a hybrid vehicle to be controlled by the vehicle control apparatus of the invention.

The power distributing mechanism 16, which is the differential mechanism connected to and between the engine 15 and the drive wheels 38, includes as major components a differential-portion planetary gear set 24 of a single pinion type, a switching clutch C0 and a switching brake B0. The differential-portion planetary gear set 24 has rotary elements consisting of a differential-portion sun gear S0, a differential-portion planetary gear P0; a differential-portion carrier C0 supporting the differential-portion planetary gear P0 such that the differential-portion planetary gear P0 is rotatable about its axis and about the axis of the differential portion sun gear S0; and a differential-portion ring gear R0 meshing with the differential-portion sun gear S0 through the differential-portion planetary gear P0.

In the present embodiment, the switching clutch C0 and brake B0 function as a differential-state switching device operable to selectively switch the differential portion 11 (power distributing mechanism 16) between a differential state, namely, a non-locked state, and a non-differential state, namely, a locked state, that is, between the differential state in which the differential portion 11 (power distributing mechanism 16) is operable as an electrically controlled differential mechanism, that is, a continuously-variable shifting state in which the differential portion 11 is operable to perform continuously variable shifting actions as an electrically controlled continuously variable transmission the speed ratio of which is continuously variable, and the locked state in which the differential portion 11 is not operable to perform the continuously variable shifting actions, that is, the differential portion 11 is not operable as the electrically controlled continuously variable transmission, and in which the speed ratio of the differential portion 11 is held fixed, namely, a fixed-speed-ratio shifting state (non-differential state) in which the differential portion 11 does not perform or is not able to electrically perform the continuously variable shifting actions and in which the differential portion 11 is operable as a transmission having a single gear position with one speed ratio or two or more gear positions with respective speed ratios, namely, the fixed-speed-ratio shifting state in which the differential portion 11 serves as a transmission having a single gear position with one fixed speed ratio or a plurality of gear positions with respective fixed speed ratios.

The automatic transmission portion 20 functions as a step-variable automatic transmission the speed ratio γAT of which (rotating speed $N_{18}$ of the power transmitting member 18/rotating speed $N_{out}$ of the output shaft 22) is variable in steps, and is a step-variable transmission of the present invention which constitutes a part of the power transmitting path between the second electric motor M2 and the drive wheels 38 or, between the engine 15 and the drive wheels 38. This automatic transmission portion 20 includes a single-pinion type first planetary gear set 26, a single-pinion type second planetary gear set 28 and a single-pinion type third planetary gear set 30. The first planetary gear set 26 has: a first sun gear S1; a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. The second planetary gear set 28 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. The third planetary gear set 30 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3.

In the vehicle 8, the engine 15 is disconnected from the power transmitting path between the second electric motor M2 and the drive wheels 38, when the first electric motor M1 is placed in a non-operated state while the differential portion 11 is placed in the differential state with both the switching clutch C0 and the switching brake B0 being held in a released state. Namely; the first electric motor M1 and the differential-portion planetary gear set 24 function as a power transmitting/cutoff device.

In the power transmitting system 10 constructed as described above, one of forward drive first-speed ($1^{st}$-speed) through fifth-speed ($5^{th}$-speed) positions or a reverse drive position is selectively established with engaging actions of respective different combinations of the above-described switching clutch C0 and switching brake B0, and a first clutch C1, a second clutch C2, a first brake B1, a second brake B2 and a third brake B3 as shown in FIG. 2, for example. A neutral position is established when all of the above-indicated coupling devices C0, B0, C1, C2 and B1-B3 are placed in the released state. The first-speed through fifth-speed positions have respective speed ratios γ (rotating speed $N_{in}$ of the input shaft 14/rotating speed $N_{out}$ of the output shaft 22) which change almost according to a geometric progression. The power transmitting system 10 is brought into its step-variable shifting state when one of the switching clutch C0 and switching brake B0 is placed into its engaged state, and into its continuously-variable shifting state when both of the switching clutch C0 and switching brake B0 are placed into their released state. The differential portion 11 can be considered to be a transmission which is switchable between its step-variable and continuously-variable shifting states. However, the switching clutch C0 and switching brake B0 need not be provided.

Figure 3:
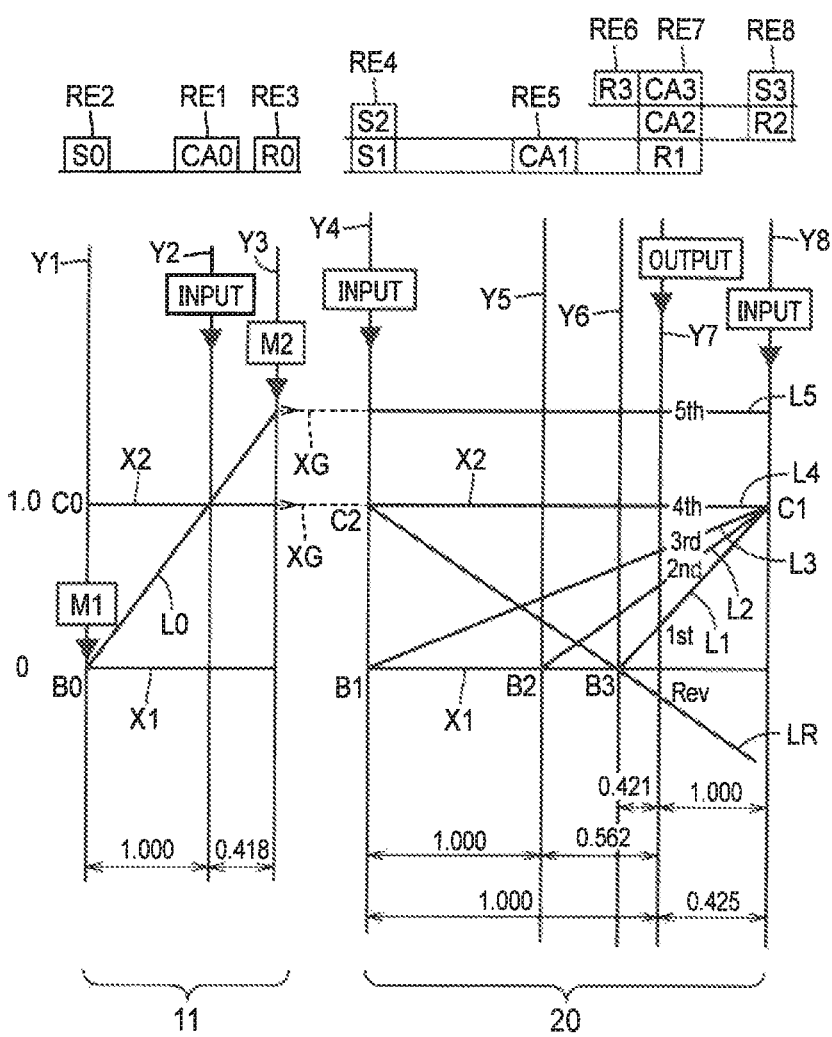
FIG. 3 is a collinear chart indicating relative rotating speeds of the vehicular power transmitting system of FIG. 1 operated in the step-variable shifting state, in different; speed positions of the vehicular power transmitting system.

The collinear chart of FIG. 3 indicates, by straight lines, a relationship among the rotating speeds of the rotary elements in each of the speed positions of the power transmitting system 10, which is constituted by the differential portion 11 functioning as the continuously-variable shifting portion or first shifting portion, and the automatic transmission portion 20 functioning as the step-variable shifting portion or second shifting portion. The collinear chart of FIG. 3 is a rectangular two-dimensional coordinate system in which the speed ratios ρ of the planetary gear sets 24, 26, 28 and 30 are taken along the horizontal axis, while the relative rotating speeds of the rotary elements are taken along the vertical axis. A lower one of three horizontal lines, that is, the horizontal line X1 indicates the rotating speed of 0, while an upper one of the three horizontal lines, that is, the horizontal line X2 indicates the rotating speed of 1.0, that is, an operating speed $N_e$ of the engine 15 connected to the input shaft 14. The horizontal line XG indicates the rotating speed of the power transmitting member 18.

Three vertical lines Y1, Y2 and Y3 corresponding to the power distributing mechanism 16 of the differential portion 11 respectively represent the relative rotating speeds of a second rotary element RE2 in the form of the differential-portion sun gear S0, a first rotary element RE1 in the form of the differential-portion carrier CA0, and a third rotary element RE3 in the form of the differential-portion ring gear R0. The distances between the adjacent ones of the vertical lines Y1, Y2 and Y3 are determined by the gear ratio ρ0 of the planetary gear set 24. Further, five vertical lines Y4, Y5, Y6, Y7 and Y8 corresponding to the automatic transmission portion 20 respectively represent the relative rotating speeds of a fourth rotary element RE4 in the form of the first and second sun gears S1 and S2 integrally fixed to each other, a fifth rotary element RE5 in the form of the first carrier CA1, a sixth rotary element RE6 in the form of he third ring gear R3, a seventh rotary element RE7 in the form of the first ring gear R1 and second and third carriers CA2 and CA3 that are integrally fixed to each other, and an eighth rotary element RE8 in the form of the second ring gear R2 and third sun gear S3 integrally fixed to each other. The distances between the adjacent ones of the vertical lines Y4-Y8 are determined by the gear ratios ρ1, ρ2 and ρ3 of the first, second and third planetary gear sets 26, 28 and 30. In the relationship among the vertical lines of the collinear chart, the distances between the sun gear and carrier of each planetary gear set correspond to "1", while the distances between the carrier and ring gear of each planetary gear set correspond to the gear ratio ρp. In the differential portion 11, the distance between the vertical lines Y1 and Y2 corresponds to "1", while the distance between the vertical lines Y2 and Y3 corresponds to the gear ratio ρ. In the automatic transmission portion 20, the distance between the sun gear and carrier of each of the first, second and third planetary gear sets 26, 28 and 30 corresponds to "1", while the distance between the carrier and ring gear of each planetary gear set 26, 28, 30 corresponds to the gear ratio ρ.

Figure 4:
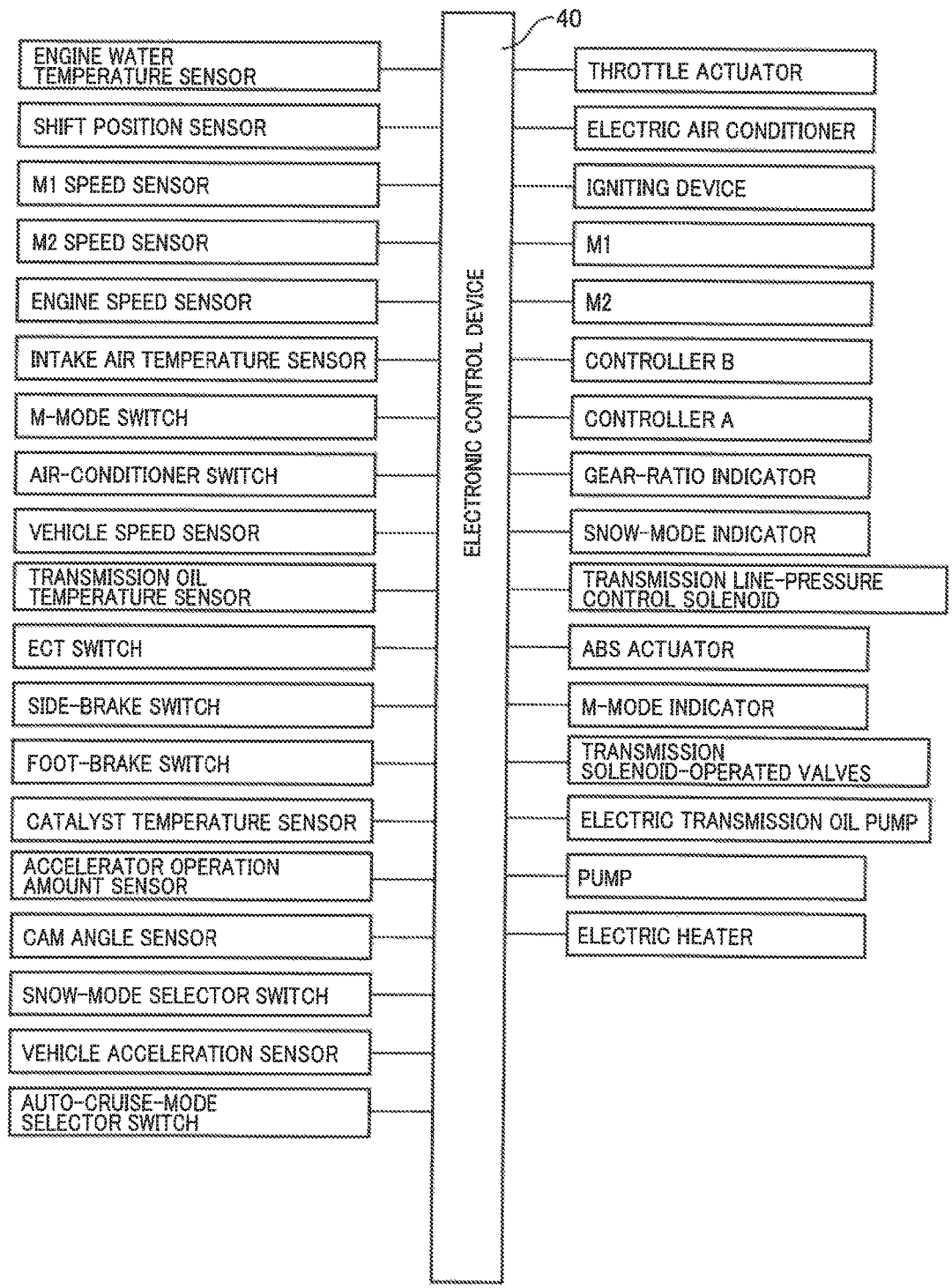
FIG. 4 is a view indicating input and output signals of an electronic control device provided for controlling the vehicular power transmitting system.

FIG. 4 indicates signals received by an electronic control device 40 provided as the control apparatus of the present invention to control the power transmitting system 10, and signals generated by the electronic control device 40. This electronic control device 40 includes a so-called microcomputer incorporating a CPU, a ROM, a RAM and an input/output interface, and is configured to process the signals according to programs stored in the ROM while utilizing a temporary data storage function of the RAM, to implement hybrid drive controls of the engine 15 and first and second electric motors M1 and M2, and drive controls such as shifting controls of the automatic transmission portion 20.

The electronic control device 40 is arranged to receive from various sensors and switches shown in FIG. 4, various signals such as: a signal indicative of a temperature Temp (° C.) of engine cooling water; a signal indicative of a selected one of shift positions $P_{SH}$ of a shift lever; an output signal of a M1 speed sensor, such as resolver, indicative of an operating speed $N_{m1}$ (rpm) of the first electric motor M1 (hereinafter referred to as "first electric motor speed $N_{m1}$"); an output signal of a M2 speed sensor 42 (shown in FIG. 1), such as resolver, indicative of an operating speed $N_{m2}$ (rpm) of the second electric motor M2 (hereinafter referred to as "second electric motor speed $N_{m2}$"); a signal indicative of the operating speed $N_e$ (rpm) of the engine 15; a signal indicative of a temperature $T_{ema}$ (° C.) of intake air supplied to the engine 15; a command signal indicative of an M mode (manual shifting drive mode); a signal indicative of an operated state of an air conditioner; an output signal of a vehicle speed sensor 44 (shown in FIG. 1) indicative of the rotating speed $N_{out}$ (rpm) of the output shaft 22 representing vehicle running speed V (km/h); a signal indicative of a temperature Tempt (° C.) of a working oil of the automatic transmission portion 20; a signal indicative of an operated state of a side brake; a signal indicative of an operated state of a foot brake pedal; a signal indicative of a temperature Tempe (° C.) of a catalyst of the engine 15; a signal indicative of an operation amount $A_{cc}$ (%) of an accelerator pedal representing a vehicle output amount required by the vehicle operator; a signal indicative of an angle of a cam of the engine 15; a signal indicative of an operating state (ON/OFF state) of a snow-mode selector switch operable to select a snow drive mode of the vehicle 8; a signal indicative of a longitudinal acceleration value (G) of the vehicle 8; a signal indicative of an operating state (ON/OFF state) of an auto-cruise-mode selector switch operable to select an auto-cruise control mode of the vehicle 8; and a signal indicative of an operating state (ON/OFF state) of an automatic-drive-mode selector switch operable to select an automatic drive mode of the vehicle 8 in which the vehicle 8 is controlled so as to trace the preceding vehicle.

The electronic control device 40 is further arranged to generate various signals such as: control signals to be applied to an engine output control device 43 (shown in FIG. 5) for controlling the output of the engine 15, for example, a drive signal to drive a throttle actuator 60 for controlling an opening angle $θ_{th}$ (%) of an electronic throttle valve 58 disposed within an intake pipe 66 of the engine 15, a signal to control an amount of injection of a fuel by a fuel injecting device 62 into cylinders of the engine 15, and a signal to be applied to an igniting device 64 to control the ignition timing of the engine 15; a signal to operate an electric air conditioner; command signals to operate the first and second electric motors M1 and M2; a signal to operate a gear-ratio indicator for indicating the gear ratio; a signal to operate a snow-mode indicator for indicating the selection of the snow drive mode of the vehicle 8; a signal to operate an ABS actuator for anti-lock braking of the vehicle wheels; a signal to operate an M-mode indicator for indicating the selection of the M mode (manual shifting mode); valve command signals to be applied to solenoid-operated valves incorporated within a hydraulic control unit 46 (shown in FIG. 5) provided to control hydraulic actuators of the hydraulically operated frictional coupling devices of the differential portion 11 and the automatic transmission portion 20; a signal to operate an electrically operated oil pump used as a hydraulic pressure source for the hydraulic control unit 46; and a signal to drive an electrically operated heater.

Figure 5:
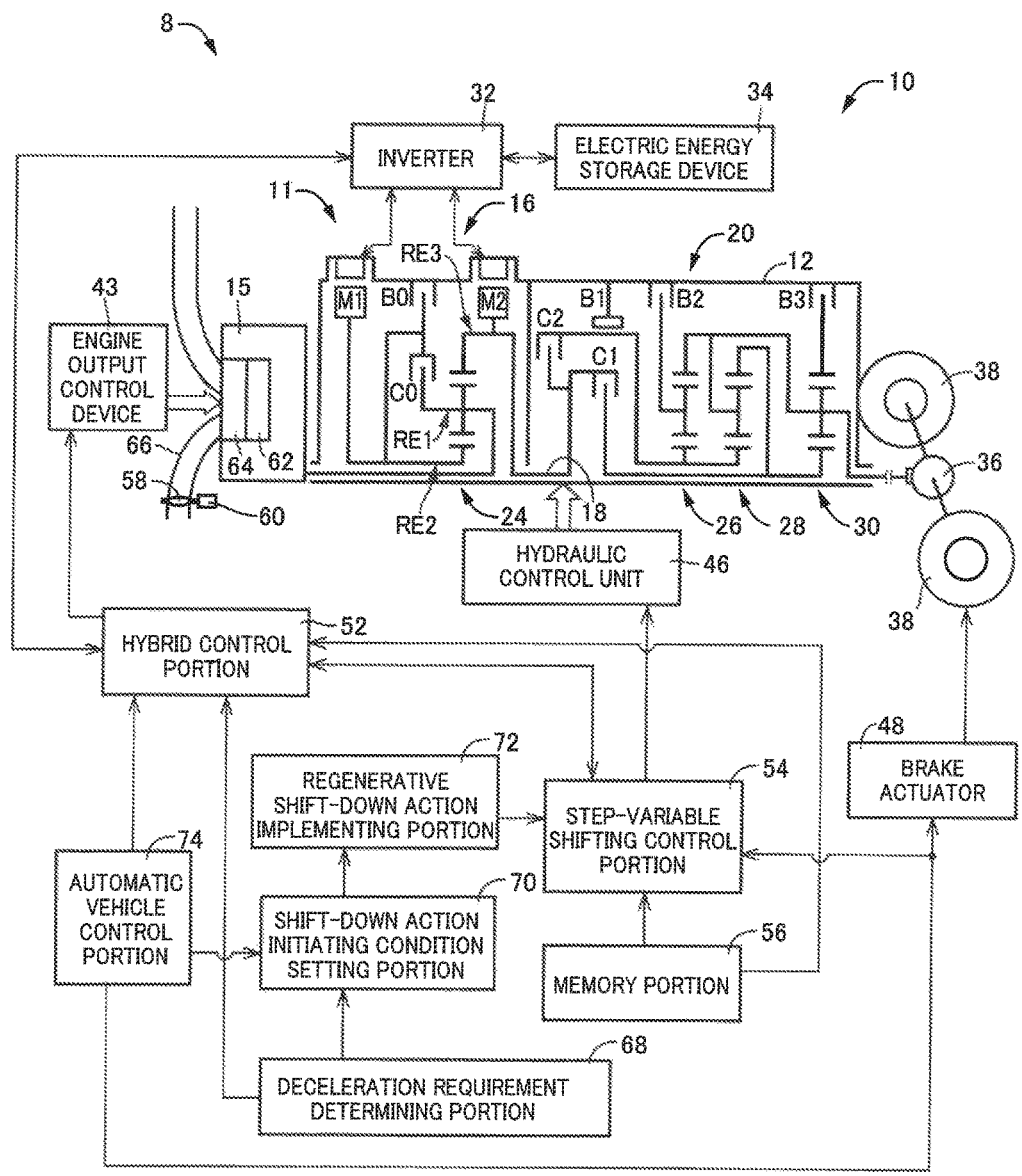
FIG. 5 is a functional block diagram illustrating major control functions of the electronic control device of FIG. 4.

FIG. 5 is the functional block diagram illustrating major control functions of the electronic control device 40. The electronic control device 40 includes a hybrid control portion 52, a step-variable shifting control portion 54, a memory portion 56, a deceleration requirement determining portion 68, a shift-down action initiating condition setting portion 70, a regenerative shift-down action implementing portion 72 and an automatic vehicle control portion 74.

The step-variable shifting control portion 54 shown in FIG. 5 functions as shifting control means for controlling shifting actions of the automatic transmission portion 20. For example, the step-variable shifting control portion 54 is configured to determine whether a shifting action of the automatic transmission portion 20 should be implemented, that is, to determine the speed position to which the automatic transmission portion 20 should be shifted. This determination is made on the basis of a condition of the vehicle 8 represented by the vehicle running speed V and a required output shaft torque $T_{out}$ of the automatic transmission portion 20, and according to a shifting boundary line map which is stored in the memory portion 56 and which is indicated by solid and one-dot chain lines in FIG. 6. The step-variable shifting control portion 54 controls the automatic transmission portion 20 so as to be shifted to the determined speed position. For example, the step-variable shifting control portion 54 applies shifting commands to the hydraulic control unit 46, to implement the engaging and/or releasing actions of the selected hydraulically operated frictional coupling devices except the switching clutch C0 and switching brake B0, according to the table of FIG. 2, to establish the determined speed position of the automatic transmission portion 20. It is noted that the required output shaft torque $T_{out}$ of the automatic transmission portion 20 (taken along the vertical axis of the shifting boundary line map of FIG. 6) increases with an increase of the operation amount $A_{cc}$ of the accelerator pedal, so that the required output shaft torque $T_{out}$ of the map may be replaced by the accelerator pedal operation amount $A_{cc}$.

The hybrid control portion 52 is configured to control the engine 15 to be operated in an operating range of high efficiency, and to control the speed ratio γ0 of the differential portion 11 operating as the electrically controlled continuously variable transmission, so as to optimize a proportion of drive forces generated by the engine 15 and the second electric motor M2, and a reaction force generated by the first electric motor M1 during its operation as the electric generator, while the power transmitting system 10 is placed in the continuously-variable shifting state, that is, while the differential portion 11 is placed in the differential state. For instance, the hybrid control portion 52 calculates a target or required vehicle output at the present running speed V of the vehicle 8, on the basis of the operation amount $A_{cc}$ of the accelerator pedal used as an operator's required vehicle output, and the vehicle running speed V, and calculates a target total vehicle output on the basis of the calculated target vehicle output and a required amount of charging of an electric energy storage device 34. The hybrid control portion 52 calculates a target output of the engine 15 to obtain the calculated target total vehicle output, while taking account of a power transmission loss, a load acting on various optional devices of the vehicle, an assisting torque to be generated by the second electric motor M2, etc. The hybrid control portion 52 controls the operating speed $N_e$ and output torque $T_e$ of the engine 15 such that the target output of the engine is obtained, and the amount of generation of the electric energy by the first electric motor M1.

The hybrid control portion 52 is configured to implement the hybrid control while taking account of the presently selected speed position of the automatic transmission portion 20, so as to improve the drivability of the vehicle 8 and the fuel economy of the engine 15. In the hybrid control, the differential portion 11 is controlled to function as the electrically controlled continuously variable transmission, for optimum coordination of the engine speed $N_e$ for efficient operation of the engine 15, and the rotating speed of the power transmitting member 18 determined by the vehicle speed V and the selected speed position of the automatic transmission portion 20. That is, the hybrid control portion 52 determines a target value of overall speed ratio γT of the power transmitting system 10, so that the engine 15 is operated such that an operating point of the engine 15 (hereinafter referred to as "engine operating point") follows a stored highest-fuel-economy curve LEF (fuel-economy map or relation). The highest-fuel-economy curve LEF is an example of curve representing an operation of the engine 15. The target value of the overall speed ratio γT of the power transmitting system 10 is set to permit the engine speed $N_e$ and output torque $T_e$ to be controlled so that the engine 15 provides an output necessary for obtaining the target vehicle output (target total vehicle output or required vehicle drive force). The highest-fuel-economy curve LEF is obtained by experimentation so as to satisfy both of the drivability and the highest fuel economy of the engine 15 during running in the continuously variable shifting state of the automatic transmission portion 20, and is defined in a two-dimensional coordinate system defined by an axis of the engine speed $N_e$ and an axis of the engine torque $T_e$. The hybrid, control portion 52 controls the speed ratio γ0 of the differential portion 11, so as to obtain the target value of the overall speed ratio γT, so that the overall speed ratio γT can be controlled within a predetermined range, for example, between 13 and 0.5. The engine operating point is a point which represents the operating state of the engine 15 and which is defined in the two-dimensional coordinate system in which selected two quantities indicative of the operating state of the engine 15 such as the engine speed $N_e$ and torque $T_e$ are taken along respective axes.

In the hybrid control, the hybrid control portion 52 controls an inverter 32 such that the electric energy generated by the first electric motor M1 is supplied to the electric energy storage device 34 and the second electric motor M2 through the inverter 32. That is, a major portion of the drive force produced by the engine 15 is mechanically transmitted to the power transmitting member 18, while the remaining portion of the drive force is consumed for electric power generation by the first electric motor M1 to convert this portion into the electric energy which is supplied through the inverter 32 to the second electric motor M2, so that the second electric motor M2 is operated with the supplied electric energy, to produce a mechanical energy to be transmitted to the power transmitting member 18. Thus, the devices relating to an operation from the generation of the electric energy to the consumption of the electric energy by the second electric motor M2 constitute an electric path through which the electric energy generated by conversion of a portion of a drive force of the engine 15 is converted into a mechanical energy.

The hybrid control portion 52 includes engine output control means functioning to control the engine 15, so as to provide a required engine output through the engine output control device 43, by controlling the throttle actuator 60 to open and close the electronic throttle valve 58, controlling an amount and time of fuel injection by the fuel injecting device 62, and/or controlling the timing of ignition by the igniting device 64, alone or in combination. For instance, the hybrid control portion 52 is basically configured to implement a throttle control by controlling the throttle actuator 60 on the basis of the accelerator pedal operation amount $A_{cc}$ and according to a predetermined stored relationship (not shown) between the accelerator pedal operation amount $A_{cc}$ and the throttle valve opening angle $\theta_{th}$ such that the opening angle $\theta_{th}$ increases with an increase of the accelerator pedal operation amount $A_{cc}$.

Figure 6:
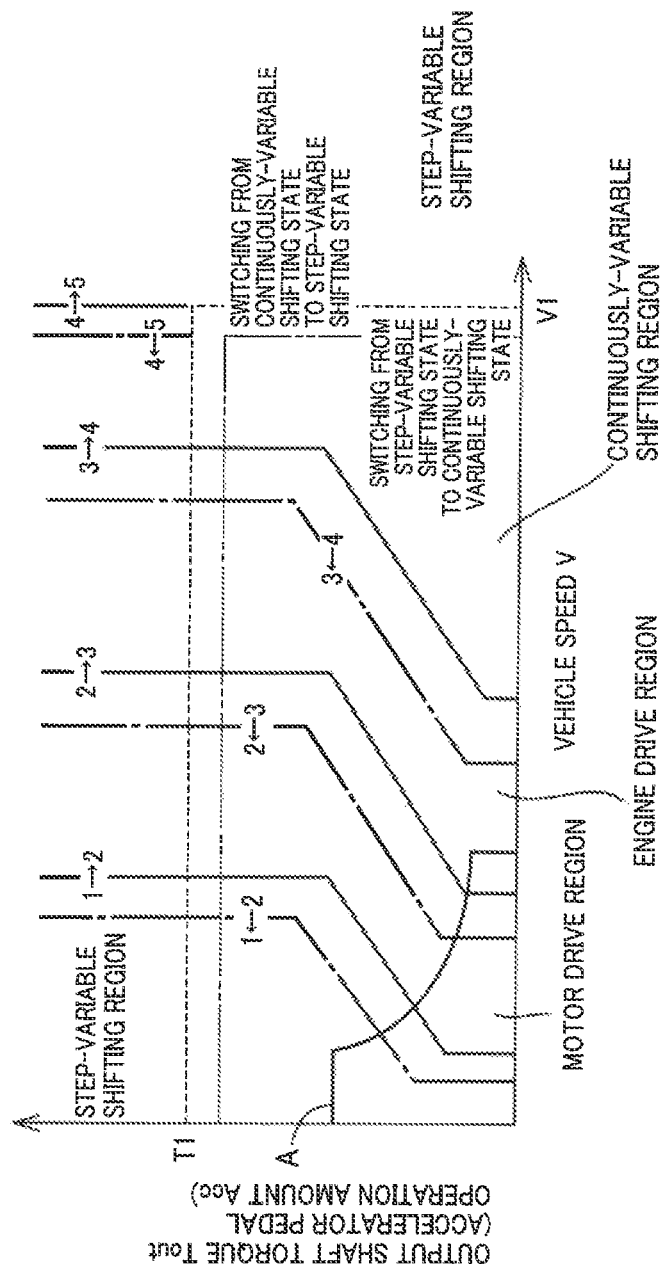
FIG. 6 is a view illustrating an example of a stored shifting boundary line map used for determining a shifting action of an automatic transmission portion, an example of a stored shifting-state switching boundary line map used for switching a shifting state of the vehicular power transmitting system, and an example of a stored drive-power-source switching boundary line map defining a boundary line between an engine drive mode and a motor drive mode, in the same two-dimensional coordinate system defined by control parameters in the form of a running speed and a required output torque of the vehicle having the vehicular power transmitting system of FIG. 1, such that those maps are related to each other.

A solid line A in FIG. 6 represents a boundary line defining an engine drive region and a motor drive region, for switching the vehicle drive power source for starting and driving the vehicle (hereinafter referred to as "vehicle driving"), between the engine 15 and the electric motor (second electric motor M2, for example). In other words, the vehicle drive mode is switchable between an engine drive mode corresponding to the engine drive region for the vehicle driving with the engine 15 used as the vehicle drive power source, and a motor drive mode corresponding to the motor drive region for the vehicle driving with the second electric motor M2 used as the vehicle drive power source. A predetermined stored relationship representing the boundary line (solid line A) of FIG. 6 for switching between the engine drive mode and the motor drive mode is an example of a drive-power-source switching boundary line map (drive-power source map) in a two-dimensional coordinate system defined by control parameters in the form of the vehicle speed V and a drive-force-related value in the form of the output shaft torque $T_{out}$. This drive-power-source switching boundary line map is stored in the memory portion 56, together with the shifting boundary line map (shifting control map) indicated by the solid lines and one-dot chain lines in FIG. 6.

The hybrid control portion 52 determines whether the vehicle condition is in the motor drive region or the engine drive region, and establishes the motor drive mode or the engine drive mode. This determination is made on the basis of the vehicle condition represented by the vehicle speed V and the required output shaft torque $T_{out}$, and according to the drive-power-source switching boundary line map of FIG. 6. As is apparent from FIG. 6, the motor drive mode is generally established by the hybrid control portion 52, when the output shaft torque $T_{out}$ is in a comparatively low range, namely, when the engine torque $T_e$ is in a comparatively low range, or when the vehicle speed V is in a comparatively low range, namely, when the vehicle load is comparatively low.

For reducing a degree of dragging of the engine 15 in its non-operated state and improving the fuel economy in the motor drive mode, the hybrid control portion 52 is configured to hold the engine speed $N_e$ at zero or substantially zero, owing to the electric CVT function (differential function) of the differential portion 11, by controlling the differential portion 11 to perform its differential function, so that the first electric motor M1 is operated at a negative speed $N_{m1}$, for instance, operated in a free state.

The hybrid control portion 52 selectively places the engine 15 in the operated state or the non-operated state, that is, to start and stop the engine 15, to selectively establish the engine drive mode or the motor drive mode. The hybrid control portion 52 selectively starts and stops the engine 15 upon determination of switching between the engine drive mode and the motor drive mode on the basis of the vehicle condition and according to the drive-power-source switching boundary line map illustrated in FIG. 6 by way of example.

The shifting boundary line map or shifting control map shown in FIG. 6 by way of example is stored in the memory portion 56 and is used for determining whether the automatic transmission portion 20 should be shifted. Shifting boundary lines of the shifting boundary line map are defined in a two-dimensional coordinate system with control parameters consisting of the vehicle speed V and the drive-force-related value in the form of the required output shaft torque $T_{out}$. In FIG. 6, the solid lines indicate shift-up boundary lines for determination of shift-up actions of the automatic transmission portion 20, while the one-dot chain lines indicate shift-down boundary lines for determination of shift-down actions of the automatic transmission portion 20. For instance, each of the shift-up and shift-down boundary lines in the shifting boundary line map in FIG. 6 consists of a stored series of shifting points for determining whether a point indicating the actual vehicle speed V has moved across the shifting line or not, at a point of intersection between the shifting line and a horizontal line indicating the required output shaft torque $T_{out}$ of the automatic transmission portion 20, or whether a point indicating the required output shaft torque $T_{out}$ of the automatic transmission portion 20 has moved across the shifting line, or not, at a point of intersection between the shifting line and a vertical line indicating the vehicle speed V, that is, for determining whether the point passes the shifting point on the shifting line to implement a shift-up or shift-down action.

The shifting boundary line map includes two broken lines in FIG. 6 respectively representing a threshold value V1 of the vehicle speed V and a threshold value T1 of the output shaft torque Tout, which are used by the hybrid control portion 52 to determine whether a point representing the condition of the vehicle 8 lies in a step-variable shifting region or a continuously-variable shifting region. Namely, the two broken lines in FIG. 6 are respectively a vertical straight line corresponding to the predetermined high-speed running threshold value V1 of the running speed V of the hybrid vehicle 8 above which the hybrid vehicle 8 is running at a comparatively high speed value, and a horizontal straight line corresponding to the predetermined high-output running threshold value T1 of the output shaft torque $T_{out}$ above which the hybrid vehicle 8 is running at a comparatively high output shaft torque value. The shifting boundary line map further includes two two-dot chain lines which provide a hysteresis with respect to the two broken lines, for determining whether the point representing the condition of the vehicle 8 lies in the step-variable or continuously-variable shifting region. FIG. 6 is also a shifting-state switching boundary line map (or relation) defined by the vehicle speed V and the output shaft torque $T_{out}$ as parameters, and is used by the hybrid control portion 52 to determine whether the differential portion 11 should be placed in the step-variable shifting state or the continuously-variable shifting state. The shifting-state switching boundary line map and the shifting boundary line map may be combined with each other as a single shifting control map and may be stored in the memory portion 58. The shifting-state switching boundary line map may include at least one of two threshold lines representing the threshold vehicle speed value V1 and the threshold output shaft torque value T1, for determination of switching of the differential portion 11 between the step-variable and continuously-variable shifting states, i.e., at least one of the vehicle speed V and the output shaft torque $T_{out}$ is used as a parameter.

The drive-force-related value referred to above is a parameter uniquely corresponding to the drive force of the vehicle 8, which may be the output shaft torque $T_{out}$ of the automatic transmission portion 20, the engine output torque $T_e$, or an acceleration value of the vehicle 8, as well as a drive torque or drive force of the drive wheels 38. The parameter may be: an actual value of the engine torque $T_e$ calculated on the basis of the accelerator pedal operation amount $A_{cc}$ or the throttle valve opening angle $\theta_{th}$ (or intake air quantity, air/fuel ratio or amount of fuel injection) and the engine speed $N_e$; or any one of estimated values of the required or target engine torque $T_e$, required or target output shaft torque $T_{out}$ of the automatic transmission portion 20 and required vehicle drive force, which are calculated on the basis of the accelerator pedal operation amount $A_{cc}$ or the throttle valve opening angle $\theta_{th}$ or the like. The above-described vehicle drive torque may be calculated on the basis of the output shaft torque $T_{out}$, etc., while taking account of the ratio of the differential gear device and the radius of the drive wheels 38, or may be directly detected by a torque sensor. The other torque values indicated above may be similarly calculated or directly detected.

As indicated by the shifting-state switching boundary line map shown in FIG. 6, the step-variable shifting region is a high torque region in which the output shaft torque Tout is equal to or higher than the predetermined high-output running threshold value T1, or a high speed region in which the vehicle speed V is higher than the predetermined high-speed running threshold value V1. Accordingly, the differential portion 11 is placed in the step-variable shifting state when the output torque $T_e$ of the engine 15 is comparatively high, or when the vehicle speed V is comparatively high. On the other hand, the differential portion 11 is placed in the continuously-variable shifting state when the output torque $T_e$ of the engine 15 is comparatively low, or when the vehicle speed V is comparatively low, namely, when the engine output torque $T_e$ is in a normal range.

The electronic control device 40 has a first control mode and a second control mode, which are selectively established on the basis of an output signal of a mode selector switch operable by the operator of the vehicle 8. In the first control mode, acceleration and deceleration (braking) of the vehicle are controlled on the basis of operations by the vehicle operator to accelerate and decelerate (brake) the vehicle, such as an operation of the accelerator pedal, an operation of the foot brake pedal, and an operation of the shift lever to select one of the forward drive speed positions. In the second control mode, the acceleration and deceleration of the vehicle are automatically adjusted so as to establish a target running state of the vehicle 8 (a target running speed, a target distance to the preceding vehicle, a target position of the vehicle 8), not depending upon the operations by the vehicle operator. Examples of the second control mode include: the above-indicated auto-cruise control mode in which the vehicle drive force is controlled such that an actual value of the vehicle speed V coincides with a predetermined target value; a preceding-vehicle tracing control mode in which the vehicle drive force is controlled such that an actual value of the distance to the preceding vehicle coincides with a target value; and a fully automatic vehicle control mode in which in addition to the auto-cruise control mode and the preceding-vehicle tracing control mode, a steering control is implemented to a steering mechanism of the vehicle 8 such that the direction of running of the vehicle 8 coincides with the direction of extension of a running lane of a roadway on which the vehicle 8 should run.

The automatic vehicle control portion 74 is configured to implement an auto-cruise vehicle control through the hybrid control portion 52, when the auto-cruise-mode selector switch is turned on by the vehicle operator. In the auto-cruise vehicle control, the vehicle speed V is controlled not depending upon the operation amount $A_{cc}$ of the accelerator pedal by the vehicle operator, such that the vehicle speed V coincides with an auto-cruise set value $V_{auto}$ set by the vehicle operator (hereinafter referred to as "set speed $V_{auto}$"). For example, the automatic vehicle control portion 74 calculates a difference $\Delta V$ ($=V_{auto}-V$) between the set speed $V_{auto}$, and the actual vehicle speed V detected by the vehicle speed sensor 44, and further calculates a target output shaft torque $T_{outtgt}$ of the output shaft 22, which zeroes the difference $\Delta V$. The hybrid control portion 52 controls the engine 15, and the first and second electric motors M1 and M2, on the basis of the target output shaft torque $T_{outtgt}$, and the required amount of charging of the electric energy storage device 34 calculated by the automatic vehicle control portion 74. Thus, the automatic vehicle control portion 74 implements the auto-cruise vehicle control for automatically adjusting the running speed V of the vehicle 8 so as to coincide with the set speed $V_{auto}$, not depending upon the operations by the vehicle operator to accelerate and decelerate the vehicle. When the auto-cruise-mode selector switch is turned off by the vehicle operator, the automatic vehicle control portion 74 terminates the auto-cruise vehicle control, and restores the electronic control device 40 back to the first control mode (manual control mode).

The automatic vehicle control portion 74 has a function of temporarily switching the vehicle control mode from the second control mode i.e. the auto-cruise control mode to the first control mode in the event of an operation of the accelerator pedal by the vehicle operator by an amount larger than a predetermined upper limit of the operation amount $A_{cc}$. In the first control mode established in this event, the acceleration or deceleration of the vehicle 8 is controlled depending upon the operation of the accelerator pedal by the vehicle operator, so that the set speed $V_{auto}$ is temporarily replaced by the vehicle speed value V corresponding to the amount $A_{cc}$ of operation of the accelerator pedal by the vehicle operator.

When an automatic vehicle control switch is operated by the vehicle operator to select the preceding-vehicle tracing control mode as the second control mode, the automatic vehicle control portion 74 implements a preceding-vehicle tracing control through the hybrid control portion 52 and a brake actuator 48. In this preceding-vehicle tracing control, the distance between the present vehicle 8 and the preceding vehicle ("vehicle-to-vehicle distance") or an estimated time of running of the vehicle 8 required for the vehicle 8 to reach the preceding vehicle ("vehicle-to-vehicle running time") is adjusted on the basis of information on the preceding vehicle received from a radar or an image sensor, and not depending upon the operations by the vehicle operator to accelerate and decelerate the vehicle 8. For example, the automatic vehicle control portion 74 calculates a target acceleration or deceleration value $G_{tgt}$ of the vehicle 8 for the preceding-vehicle tracing control on the basis of the received preceding vehicle information, so that the vehicle-to-vehicle distance or running time coincides with a predetermined target value, for instance. The automatic vehicle control portion 74 controls the engine 15, the first and second electric motors M1 and M2, and braking forces to be generated by wheel braking devices, through the hybrid control portion 52, so that the target acceleration or deceleration value $G_{tgt}$ is established.

When the automatic vehicle control switch is operated by the vehicle operator to select the fully automatic vehicle control mode as the second control mode, the automatic vehicle control portion 74 implements a fully automatic vehicle control on the basis of the preceding vehicle information received from the radar or image sensor, and information on running lanes of the roadway. In the fully automatic vehicle control, acceleration, deceleration (braking) and steering of the vehicle 8 are automatically controlled not depending upon the operations by the vehicle operator, so that the vehicle 8 is run to a desired destination so as to follow the running lanes, without collision of the vehicle 8 with the other vehicles and any obstacles, without a need of the vehicle operator's manipulation. For example, the automatic vehicle control portion 74 implements not only the auto-cruise vehicle control for controlling the acceleration and deceleration (braking) of the vehicle 8 such that the vehicle speed V coincides with the set speed $V_{auto}$, and the preceding-vehicle tracing control such that the vehicle-to-vehicle distance or vehicle-to-vehicle interval time coincides with respective target value, but also an automatic steering control to automatically control the steering device. In the fully automatic vehicle control, therefore, the vehicle operator tends to feel a higher degree of a shifting shock of the automatic transmission portion 20 relative to the auto-cruise control or the preceding-vehicle tracing control.

The hybrid control portion 52 is configured to implement a regenerative control during a decelerating run of the vehicle 8 in the first or second control mode. In the regenerative control, the engine 15 is placed in the non-operated state, and a kinetic energy of the running vehicle 8 transmitted from the drive wheels 38 is converted by the differential portion 11 into an electric energy. Described more specifically the hybrid control portion 52 implements the regenerative control to cause the second electric motor M2 to operate as an electric generator for performing a regenerative operation, with a reverse drive force transmitted from the drive wheels 38 to the engine 15. The electric energy regenerated by the second electric motor M2 is supplied, as a regenerative electric power $P_{m2r}$ (unit "kW", for example: hereinafter referred to as "second electric motor regenerative electric power $P_{m2r}$"), to the electric energy storage device 34 through the inverter 32, so that the electric energy storage device 34 is charged with the second electric motor regenerative electric power $P_{m2r}$. It is noted that the second electric motor regenerative electric power $P_{m2r}$ has a positive value when the second electric motor is regenerating.

The hybrid control portion 52 is further configured to implement the regenerative control of the second electric motor M2 before and after as well as during a shifting action of the automatic transmission portion 20, during the decelerating run of the vehicle 8 with the regenerative operation of the second electric motor M2 (hereinafter referred to as "regenerative decelerating run"). Namely, during the regenerative decelerating run of the vehicle 8, the step-variable shifting control portion 54 commands the automatic transmission portion 20 to implement a shift-down action ("regenerative shift-down action") during the regenerative operation of the second electric motor M2.

By the way, the vehicle operator may feel a discomfort with a shift-down shock caused by a variation of the longitudinal acceleration value G of the vehicle 8 due to a variation of a braking force acting on the drive wheels 38, upon the regenerative shift-down action of the automatic transmission portion 20, particularly in the second control mode in which the vehicle is controlled not depending upon the vehicle operator's operations to accelerate and decelerate (brake) the vehicle 8.

The deceleration requirement determining portion 68 is configured to determine a requirement by the vehicle operator for deceleration of the vehicle 8, on the basis of an operation of the foot brake pedal or the shift lever by the vehicle operator, for example, in the first control mode in which the vehicle 8 is controlled on the basis of the operations by the vehicle operator to accelerate and decelerate the vehicle 8. For instance, the above-indicated operation of the shift lever may be an operation of the shift lever to a manual forward-drive shifting position "M" to establish a manual shifting mode in which automatic shift-up actions of the automatic transmission portion 20 to its relatively high-speed forward drive positions of speed ratios exceeding a limited range of the overall speed ratio γT are limited, that is shifting range in which the automatic transmission portion 20 can be shifted is limited.

The automatic vehicle control portion 74 makes a determination of the requirement for deceleration of the vehicle 8 in any one of the following cases, for example: a case where the distance between the vehicle 8 and the preceding vehicle obtained on the basis of an output of a millimeter-wave radar or any other radar, or an image sensor has become shorter than a predetermined value; a case where the distance between the vehicle 8 and the preceding vehicle is estimated to be shorter than a predetermined value, on the basis of an output signal of a foot-brake switch provided on the preceding vehicle, which output signal is received by communication with the preceding vehicle; a case where the roadway on which the vehicle 8 is running is, or is estimated to be, a downhill roadway, according to the gradient of the roadway surface obtained on the basis of GPS information on the present location of the vehicle 8 represented by map information or signals received by a receiver of a GPS (Global Positioning System), for example; a case where there is a traffic jam or a traffic jam is predicted on the roadway on the basis of VICS information on the traffic jam received by a receiver of a VICS (registered trademark: Vehicle Information and Communication System) provided on the vehicle 8; a case where a movement of a walker or a bicycle toward a position in front of the vehicle 8 has been detected on the basis of information obtained by communication between the vehicle 8 and a mobile phone carried by the walker or access points on the road, or information received by a radar using radio wave of millimeter wave length or any other radar; a case where a movement of the walker or a bicycle toward the vehicle 8 is estimated on the basis of information on locations of past traffic accidents; and a case where stopping of the vehicle 8 on the red signal is estimated on the basis of the VICS information. The VICS is a system in which road traffic information (VICS information) on the traffic jam and traffic restrictions is transmitted to car navigation systems of vehicles through FM multiplexing data broadcasting systems or wireless information transmitting systems provided along main roadways. When the automatic vehicle control portion 74 has determined the requirement for deceleration of the vehicle 8, the automatic vehicle control portion 74 commands the hybrid control portion 52 to command the second electric motor M2 to perform a regenerative operation, to command the brake actuator 48 to operate for braking or decelerating the vehicle 8, or to command the step-variable shifting control portion 54 to command the automatic transmission portion 20 to perform a shift-down action for decelerating the vehicle 8. The shift-down action of the automatic transmission portion 20 to decelerate the vehicle 8 with a rise of the operating speed of the second electric motor M2 is performed in accordance with the command to the step-variable shifting control portion 54.

When the regenerative deceleration of the vehicle 8 is implemented by the regenerative operation of the second electric motor M2 under the control of the hybrid control portion 52 as a result of determination of the requirement for deceleration of the vehicle 8 by the deceleration requirement determining portion 68 in the first or second control mode, the deceleration requirement determining portion 68 commands the hybrid control portion 52 to command the switching clutch C0 and the switching brake B0 to be brought into their released state, and to command the first electric motor M1 to be placed in the non-operated state (freely rotating state), so that the engine 15 is disconnected from the power transmitting path between the second electric motor M2 and the drive wheels 38. During the regenerative deceleration of the vehicle 8 in the first and second control modes in which the engine 15 is disconnected from the power transmitting path between the second electric motor M2 and the drive wheels 38, an inertia of the engine 15 acts on the drive wheels 38.

When the deceleration requirement determining portion 68 or the automatic vehicle control portion 74 has determined the requirement for deceleration of the vehicle 8, the shift-down action initiating condition setting portion 70 determines that the first control mode is established, when the shift-down action initiating condition setting portion 70 does not receive a signal indicative of ON state from either the auto-cruise-mode selector switch and the automatic vehicle control switch, and determines that the second control mode is established when the auto-cruise-mode selector switch or the automatic vehicle control switch is placed in their ON state.

Figure 7:
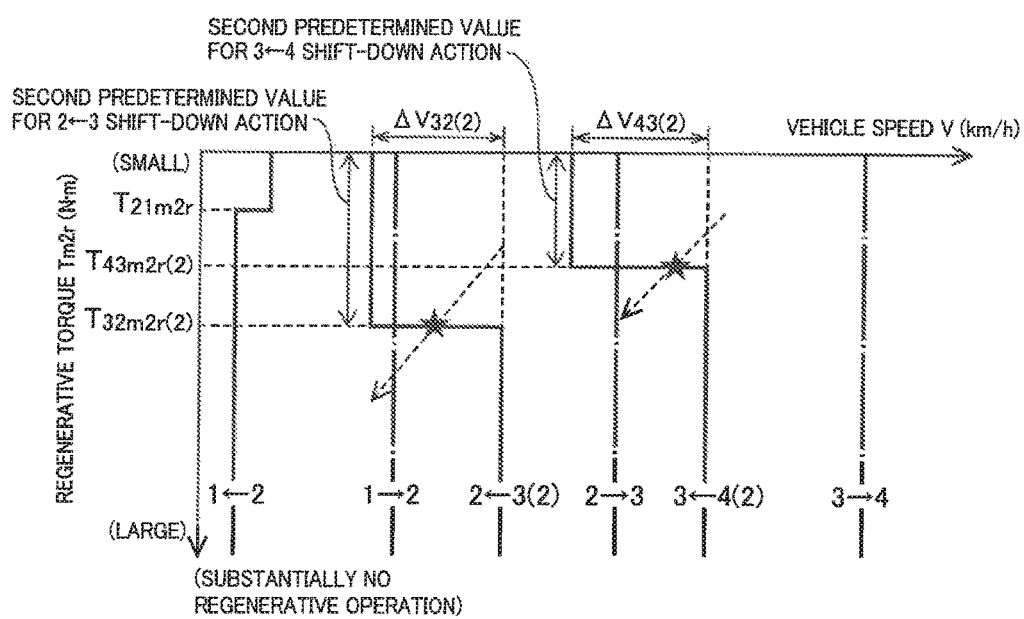
FIG. 7 is a view illustrating an example of a stored regenerative shift-down boundary line map used for determining a regenerative shift-down action of the automatic transmission portion during a regenerative decelerating run of the vehicle in a first control mode.
Figure 8:
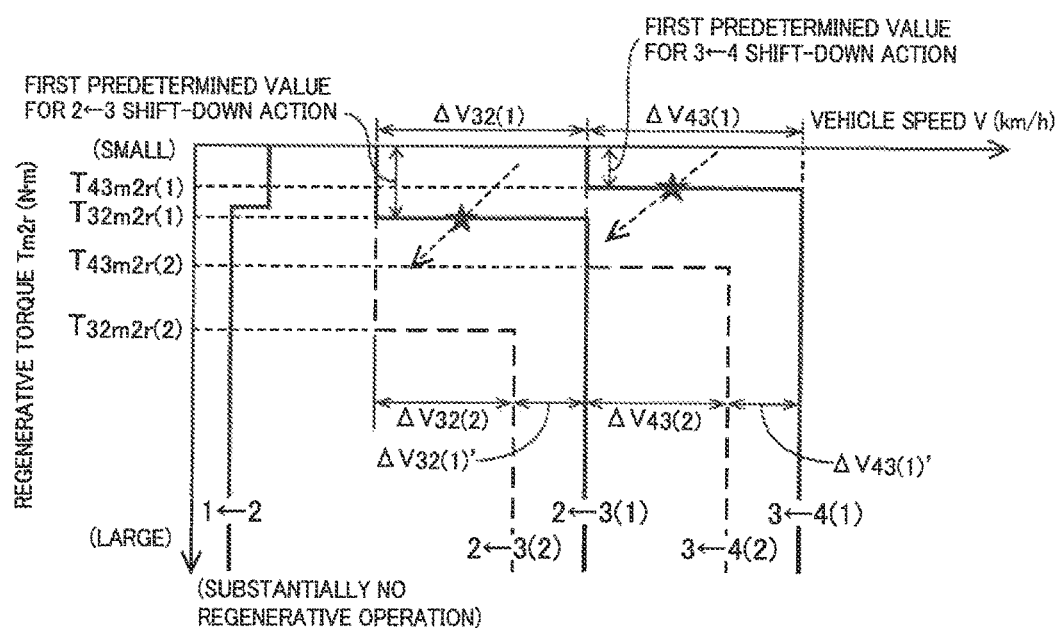
FIG. 8 is a view illustrating an example of a stored regenerative shift-down boundary line map used for determining a regenerative shift-down action of the automatic transmission portion during a regenerative decelerating run of the vehicle in a second control mode.

When the shift-down action initiating condition setting portion 70 determines that the first control mode is established, after the determination of the requirement for deceleration of the vehicle 8 by the deceleration requirement determining portion 68, the shift-down action initiating condition setting portion 70 selects a regenerative shift-down boundary line map for the first control mode to be used during a regenerative decelerating run of the vehicle 8, so as to set a shift-down action initiating condition used in the first control mode. FIGS. 7 and 8 are views illustrating examples of stored regenerative shift-down boundary line maps used during regenerative decelerating runs of the vehicle 8 in the respective first and second control modes. As shown in FIGS. 7 and 8, each of the regenerative shift-down boundary line maps is defined in a two-dimensional coordinate system in which the regenerative torque of the second electric motor M2 (hereinafter referred to as "second electric motor regenerative torque $T_{m2r}$") is taken along a vertical axis, while the vehicle speed V is taken along a horizontal axis. It is noted that the second electric motor regenerative torque $T_{m2r}$ taken along the vertical axis corresponds to a regenerative braking force, and may be replaced by an estimated (required) value of the second electric motor regenerative torque $T_{m2r}$, an input torque $T_{in}$ of the automatic transmission portion 20 received by the power transmitting member 18 (transmission input torque $T_{in}$), the output shaft torque $T_{out}$ (transmission output torque $T_{out}$), a required amount of deceleration of the vehicle 8, a negative value of a required vehicle drive force, or any other torque-related value related to the second electric motor regenerative torque $T_{m2r}$. The regenerative shift-down boundary lines used in the first and second control modes for the automatic transmission portion 20 correspond to the shift-down action initiating conditions used for the step-variable transmission of the vehicle 8 to be controlled by the control apparatus according to the present invention.

A regenerative shift-down boundary line (hereinafter referred to as "regenerative shift-down boundary line 3←4 (2)") which is indicated by a solid line in FIG. 7 and which is used for determining initiation of the regenerative shift-down action of the automatic transmission portion 20 from the $4^{th}$-speed position to the $3^{rd}$-speed position in the first control mode is formulated such that a shift-down threshold value of the vehicle speed V where the second electric motor regenerative torque $T_{m2r}$ is larger than a second predetermined value $T_{43m2r(2)}$ set for the shift-down action from the $4^{th}$-speed position to the $3^{rd}$-speed position is higher by a second amount of difference $\Delta V_{43(2)}$ than where the second electric motor regenerative torque $T_{m2r}$ is smaller than the second predetermined value $T_{43m2r(2)}$. Further, a regenerative shift-down boundary line (hereinafter referred to as "regenerative shift-down boundary line 2←3(2)") also indicated by a solid line in FIG. 7 and used for determining initiation of the regenerative shift-down action of the automatic transmission portion 20 from the $3^{rd}$-speed position to the $2^{nd}$-speed position in the first control mode is formulated such that a shift-down threshold value of the vehicle speed V where the second electric motor regenerative torque $T_{m2r}$ is larger than a second predetermined value $T_{32m2r(2)}$ set for the shift-down action from the $3^{rd}$-speed position to the $2^{nd}$-speed position is higher by a second amount of difference $\Delta V_{32(2)}$ than where the second electric motor regenerative torque $T_{m2r}$ is smaller than the second predetermined value $T_{32m2r(2)}$. The second predetermined values $T_{43m2r(2)}$ and $T_{32m2r(2)}$ indicated in FIG. 7 as "SECOND PREDETERMINED VALUE FOR 3←4 SHIFT-DOWN ACTION", and "SECOND PREDETERMINED VALUE FOR 2←3 SHIFT-DOWN ACTION" respectively are comparatively high shift-down threshold values of the second electric motor regenerative torque $T_{m2r}$, which are set for the respective regenerative shift-down boundary lines used in the first control mode. A mark "*" in FIG. 7 indicates points at which the regenerative shift-down actions are initiated. The second predetermined values $T_{43m2r(2)}$ and $T_{32m2r(2)}$ are comparatively large values. Since the regenerative shift-down action from the $4^{th}$-speed position to the $3^{rd}$-speed position or from the $3^{rd}$-speed position to the $2^{nd}$-speed position is initiated when the second electric motor regenerative torque $T_{m2r}$ is larger than the comparatively high second predetermined values $T_{43m2r(2)}$ and $T_{32m2r(2)}$, the regenerative shift-down action causes a considerably large amount of rise of the second electric motor speed $N_{m2}$, so that an energy loss of the second electric motor M2 during the regenerative decelerating run of the vehicle 8 is reduced, namely, the second electric motor M2 is operated at an operating point of a comparatively small amount of energy loss after initiation of the regenerative shift-down action.

Further, a regenerative shift-down boundary line (hereinafter referred to as "regenerative shift-down boundary line 1←2") also indicated by a solid line in FIG. 7 and used for determining initiation of the regenerative shift-down action of the automatic transmission portion 20 from the $2^{nd}$-speed position to the $1^{st}$-speed position in the first control mode is formulated such that a shift-down threshold value of the vehicle speed V where the second electric motor regenerative torque $T_{m2r}$ is larger than a predetermined value $T_{21m2r}$ is lower than where the second electric motor regenerative torque $T_{m2r}$ is smaller than the predetermined value $T_{21m2r}$. The predetermined value $T_{21m2r}$ is smaller than the second predetermined value $T_{43m2r(2)}$ used for the regenerative shift-down action from the $4^{th}$-speed position to the $3^{rd}$-speed position. For the regenerative shift-down action from the $2^{nd}$-speed position to the $1^{st}$-speed position, the shift-down threshold value of the vehicle speed V is comparatively low while the second electric motor regenerative torque $T_{m2r}$ is larger than the comparatively small predetermined value $T_{21m2r}$. Thus, the regenerative shift-down boundary line for the regenerative shift-down action from the $2^{nd}$-speed position to the $1^{st}$-speed position is formulated to effectively reduce the shifting shock during this regenerative shift-down action, rather than to reduce the energy loss of the second electric motor M2.

Three one-dot chain lines indicated in FIG. 7 represent respective regenerative shift-up boundary lines of a regenerative shift-up boundary line map used in the first control mode for determining initiation of a regenerative shift-up action of the automatic transmission portion 20 from the $3^{rd}$-speed position to the $4^{th}$ speed position, a regenerative shift-up action of the same from the $2^{nd}$-speed position to the $3^{rd}$-speed position, and regenerative shift-up action of the same from the $1^{st}$-speed position to the $2^{nd}$-speed position. These regenerative shift-up boundary lines represent respective shift-up threshold values of the vehicle speed V, which are set to be higher than the shift-down threshold values represented by the corresponding regenerative shift-down boundary lines, so that the regenerative shift-up actions are less likely to be unnecessarily implemented after the corresponding regenerative shift-down actions. It is noted that a regenerative shift-up boundary line map which is similar to that of FIG. 7 and which is used in the second control mode is provided together with a regenerative shift-down boundary line map which is indicated in FIG. 8 and which is used in the second control mode. However, the regenerative shift-up boundary lines used in the second control mode is not indicated in FIG. 8.

When the shift-down action initiating condition setting portion 70 determines that the second control mode is established, after the determination of the requirement for deceleration of the vehicle 8 by the automatic vehicle control portion 74, the shift-down action initiating condition setting portion 70 selects the regenerative shift-down boundary line map for the second control mode indicated in FIG. 8 and used during a regenerative decelerating run of the vehicle 8 in the second control mode, so as to set a shift-down action initiating condition used in the second control mode in consideration with the second electric motor regenerative torque $T_{m2r}$ and the vehicle speed V. For comparison, broken lines in FIG. 8 represent the regenerative shift-down boundary lines 3←4(2) and 2←3(2) indicated in FIG. 7 and used in the first control mode. It is noted that a regenerative shift-down boundary line 1←2 used in the second control mode is the same as that used in the first control mode.

A regenerative shift-down boundary line (hereinafter referred to as "regenerative shift-down boundary line 3←4 (1)") which is indicated by a solid line in FIG. 8 and which is used for determining initiation of the regenerative shift-down action of the automatic transmission portion 20 from the $4^{th}$-speed position to the $3^{rd}$-speed position in the second control mode is formulated such that a shift-down threshold value of the vehicle speed V while the second electric motor regenerative torque $T_{m2r}$ is larger than a first predetermined value $T_{43m2r(1)}$ for the regenerative shift-down action from the $4^{th}$-speed position to the $3^{rd}$-speed position is higher by a first amount of difference $\Delta V_{43(1)}$ than while the second electric motor regenerative torque $T_{m2r}$ is smaller than the first predetermined value $T_{43m2r(1)}$. Further, a regenerative shift-down boundary line (hereinafter referred to as "regenerative shift-down boundary line 2←3(1)") indicated by a solid line in FIG. 8 and used for determining initiation of the regenerative shift-down action of the automatic transmission portion 20 from the $3^{rd}$-speed position to the $2^{nd}$-speed position in the second control mode is formulated such that a shift-down threshold value of the vehicle speed V while the second electric motor regenerative torque $T_{m2r}$ is larger than a first predetermined value $T_{32m2r(1)}$ for the regenerative shift-down action from the $3^{rd}$-speed position to the $2^{nd}$-speed position is higher by a first amount of difference $\Delta V_{32(1)}$ than while the second electric motor regenerative torque $T_{m2r}$ is smaller than the first predetermined value $T_{32m2r(1)}$. The first predetermined values $T_{43m2r(1)}$ and $T_{32m2r(1)}$ which are indicated as "FIRST PREDETERMINED VALUE FOR 3←4 SHIFT-DOWN ACTION" and "FIRST PREDETERMINED VALUE FOR 2←3 SHIFT-DOWN ACTION" respectively in FIG. 8, are shift-down threshold values of the second electric motor regenerative torque $T_{m2r}$ which are set for the respective regenerative shift-down boundary lines used in the second control mode. The first predetermined value $T_{43m2r(1)}$ is smaller than the second predetermined value $T_{43m2r(2)}$ used in the first control mode, and the first predetermined value $T_{32m2r(1)}$ is smaller than the second predetermined value $T_{32m2r(2)}$ used in the first control mode. The first amount of difference $\Delta V_{43(1)}$ used in the second control mode is larger than the second amount of difference $\Delta V_{43(2)}$ used in the first control mode, and the first amount of difference $\Delta V_{32(1)}$ used in the second control mode is larger than the second amount of difference $\Delta V_{32(2)}$ used in the first control mode. Accordingly, the first amount of difference $\Delta V_{43(1)}$ between the threshold value of the vehicle speed V according to the regenerative shift-down boundary line 3←4(1) and that according to the regenerative shift-down boundary line 3←4(2) when the second electric motor regenerative torque $T_{m2r}$ is smaller than the second predetermined value $T_{43m2r(2)}$ is larger than an amount of difference $\Delta V_{43(1)}'$ $(=\Delta V_{43(1)}-\Delta V_{43(2)})$ between the threshold value of the vehicle speed V according to the regenerative shift-down boundary line 3←4(1) and that according to the regenerative shift-down boundary line 3←4(2) when the second electric motor regenerative torque $T_{m2r}$ is larger than the second predetermined value $T_{43m2r(2)}$ according to the regenerative shift-down boundary lines 3←4(2) and 3←4(1). Similarly, the first amount of difference $\Delta V_{32(1)}$ between the threshold value of the vehicle speed V according to the regenerative shift-down boundary line 2←3(1) and that according to the regenerative shift-down boundary line 2←3(2) when the second electric motor regenerative torque $T_{m2r}$ is smaller than the second predetermined value $T_{32m2r(2)}$ is larger than an amount of difference $\Delta V_{32(1)}'$ $(=\Delta V_{32(1)}-\Delta V_{32(2)})$ between the threshold value of the vehicle speed V according to the regenerative shift-down boundary line 2←3(1) and that according to the regenerative shift-down boundary line 2←3(2) when the second electric motor regenerative torque $T_{m2r}$ is larger than the second predetermined value $T_{32m2r(2)}$ according to the regenerative shift-down boundary lines 2←3(2) and 2←3(1). Namely, the regenerative shift-down boundary line 3←4(1) used in the second control mode is formulated such that the regenerative shift-down action of the automatic transmission portion 20 from the $4^{th}$-speed position to the $3^{rd}$-speed position is initiated at a higher value of the vehicle speed V, than that according to the regenerative shift-down boundary line 3←4(2) used in the first control mode, when the second electric motor regenerative torque $T_{m2r}$ is comparatively large. Similarly, the regenerative shift-down boundary line 2←3(1) used in the second control mode is formulated such that the shift-down action of the automatic transmission portion 20 from the $3^{rd}$-speed position to the $2^{nd}$-speed position is initiated at a higher value of the vehicle speed V, than that according to the regenerative shift-down boundary line 2←3(2) used in the first control mode, when the second electric motor regenerative torque $T_{m2r}$ is comparatively large.

The regenerative shift-down boundary line 3←4(1) indicated in FIG. 8 and used in the second control mode is a line of shift-down threshold values of the second electric motor regenerative torque $T_{m2r}$ and the vehicle speed V, which line is formulated such that the regenerative shift-down action of the automatic transmission portion 20 from the $4^{th}$-speed position to the $3^{rd}$-speed position is initiated during the regenerative decelerating run of the vehicle 8, for example, when a point indicative of the running state of the vehicle 8 represented by the second electric motor regenerative torque $T_{m2r}$ and the vehicle speed V moves as indicated by an arrow-headed broken line, in a downward direction as seen in FIG. 8, that is, when the second electric motor regenerative torque $T_{m2r}$ has become larger than the first predetermined value $T_{43m2r(1)}$ while the vehicle speed V is in a range of the first amount of difference $\Delta V_{43(1)}$. Similarly, the regenerative shift-down boundary line 2←3(1) used in the second control mode is a line of shift-down threshold values of the second electric motor regenerative torque $T_{m2r}$ and the vehicle speed V, which line is formulated such that the regenerative shift-down action of the automatic transmission portion 20 from the $3^{rd}$-speed position to the $2^{nd}$-speed position is initiated during the regenerative decelerating run of the vehicle 8, for example, when the point indicative of the running state of the vehicle 8 moves as indicated by another arrow-headed broken line, in a downward direction as seen in FIG. 8, that is, when the second electric motor regenerative torque $T_{m2r}$ has become larger than the first predetermined value $T_{32m2r(1)}$ while the vehicle speed V is in a range of the first amount of difference $\Delta V_{32(1)}$. The mark "*" lying on the regenerative shift-down boundary lines 3←4(1) and 2←3(1) indicates examples of points at which the regenerative shift-down actions are initiated during a change of the running state of the vehicle 8, as the shift-down action initiating conditions. In these examples, the regenerative shift-down action from the $4^{th}$-speed position to the $3^{rd}$-speed position is initiated in the second control mode, as a result of an increase of the second electric motor regenerative torque $T_{m2r}$ to a value larger than the first predetermined value $T_{43m2r(1)}$ while the vehicle speed V is in the range of the first amount of difference $\Delta V_{43(1)}$. Similarly, the regenerative shift-down action from the $3^{rd}$-speed position to the $2^{nd}$-speed position is initiated in the second control mode, as a result of an increase of the second electric motor regenerative torque $T_{m2r}$ to a value larger than the first predetermined value $T_{32m2r(1)}$ while the vehicle speed V is in the range of the first amount of difference $\Delta V_{32(1)}$. Accordingly, the regenerative shift-down actions from the $4^{th}$-speed position to the $3^{rd}$-speed position and from the $3^{rd}$-speed position to the $2^{nd}$-speed position are initiated in the second control mode before an amount of change of the braking force applied to the vehicle 8 during its regenerative deceleration increases to a value above which the vehicle operator feels a discomfort with the amount of change of the braking force.

The first predetermined values $T_{43m2r(1)}$ and $T_{32m2r(1)}$ may be constants, or variables which vary according to the vehicle speed V or according to the operation amount $A_{cc}$ of the accelerator pedal or any other operation by the vehicle operator. The first predetermined values $T_{43m2r(1)}$ and $T_{32m2r(1)}$ may be determined depending upon a degree of possibility of manual intervention by the vehicle operator in the automatic control mode. For instance, the first predetermined values $T_{43m2r(1)}$ and $T_{32m2r(1)}$ used for the regenerative shift-down actions from the $4^{th}$-speed position to the $3^{rd}$-speed position and from the $3^{rd}$-speed position to the $2^{nd}$-speed position are preferably determined to be different values in the respective auto-cruise control mode and fully automatic vehicle control mode, in view of a lower degree of possibility of the manual intervention by the vehicle operator in the fully automatic vehicle control mode than in the auto-cruise control mode. Namely, the first predetermined values $T_{43m2r(1)}$ and $T_{32m2r(1)}$ used in the fully automatic vehicle control mode are preferably determined to be smaller than those used in the auto-cruise control mode. In this case, an amount of variation of the vehicle braking force during the regenerative shift-down action can be made smaller in the fully automatic vehicle control mode in which the vehicle operator tends to more sensitively feel a shift-down shock of the automatic transmission portion 20 than in the auto-cruise control mode. Accordingly, it is possible to adequately reduce the discomfort felt by the vehicle operator due to the shift-down shock, even in the fully automatic vehicle control mode.

According to the regenerative shift-down boundary line 3←4(1) used in the second control mode, the first amount of difference $\Delta V_{43(1)}$ when the second electric motor regenerative torque $T_{m2r}$ is larger than the second predetermined value $T_{43m2r(2)}$ used for the regenerative shift-down action from the $4^{th}$-speed position to the $3^{rd}$-speed position in the first control mode is smaller than the first amount of difference $\Delta V_{43(1)}$ when the second electric motor regenerative torque $T_{m2r}$ is smaller than the second predetermined value $T_{43m2r(2)}$. That is, the shift-down threshold value of the vehicle speed V according to the regenerative shift-down boundary line 3←4(1) is closer to that according to the regenerative shift-down boundary line 3←4(2) used in the first control mode, when the second electric motor regenerative torque $T_{m2r}$ is larger than the second predetermined value $T_{43m2r(2)}$. Similarly, according to the regenerative shift-down boundary line 2←3(1) used in the second control mode, the first amount of difference $\Delta V_{32(1)}'$ when the second electric motor regenerative torque $T_{m2r}$ is larger than the second predetermined value $T_{32m2r(2)}$ used for the regenerative shift-down action from the $3^{rd}$-speed position to the $2^{nd}$-speed position in the first control mode is smaller than the first amount of difference $\Delta V_{32(1)}$ when the second electric motor regenerative torque $T_{m2r}$ is smaller than the second predetermined value $T_{32m2r(2)}$. That is, the shift-down threshold value of the vehicle speed V according to the regenerative shift-down boundary line 2←3(1) is closer to that according to the regenerative shift-down boundary line 2←3(2) used in the first control mode, when the second electric motor regenerative torque $T_{m2r}$ is larger than the second predetermined value $T_{32m2r(2)}$. Accordingly, the timing of raising the second electric motor speed $N_{m2}$ when the second electric motor regenerative torque $T_{m2r}$ is relatively large, i.e., larger than the second predetermined value $T_{43m2r(2)}$ or $T_{32m2r(2)}$ can be made closer to that in the first control mode in which the fuel economy of the vehicle 8 is higher. Therefore, the energy loss of the second electric motor M2 during the regenerative deceleration of the vehicle 8 can be more effectively reduced.

The regenerative shift-down action implementing portion 72 is configured to determine whether the shift-down action initiating condition set by the shift-down action initiating condition setting portion 70 is satisfied or not. This determination is made according to the stored regenerative shift-down boundary line map indicated in FIG. 7 and used in the first control mode, and the stored regenerative shift-down boundary line map indicated in FIG. 8 and used in the second control mode, and on the basis of the second electric motor regenerative torque $T_{m2r}$ and the vehicle speed V. Described more specifically, the regenerative shift-down action implementing portion 72 determines whether the second electric motor regenerative torque $T_{m2r}$ has $T_{m2r}$ has become larger than the threshold value (first predetermined value $T_{43m2r(1)}$ or $T_{32m2r(1)}$ for the regenerative shift-down action from the $4^{th}$-speed position to the $3^{rd}$-speed position or from the $3^{rd}$-speed position to the $2^{nd}$-speed position, or second predetermined value $T_{43m2r(2)}$ or $T_{32m2r(2)}$ for the regenerative shift-down action from the $4^{th}$-speed position to the $3^{rd}$-speed position or from the $3^{rd}$-speed position to the $2^{nd}$-speed position). When the regenerative shift-down action implementing portion 72 has determined that the second electric motor regenerative torque $T_{m2r}$ has become larger than the threshold value, the regenerative shift-down action implementing portion 72 applies a regenerative shift-down action initiating command to the sep-variable shifting control portion 54. The regenerative shift-down action of the automatic transmission portion 20 from the $4^{th}$-speed position to the $3^{rd}$-speed position or from the $3^{rd}$-speed position to the $2^{nd}$-speed position according to the regenerative shift-down boundary line map of FIG. 8 is initiated in the second control mode, when a shorter length of time has passed after a moment of initiation of the regenerative operation of the second electric motor M2 according to the determination of the requirement for deceleration of the vehicle 8, than in the first control mode. For instance, the regenerative shift-down actions in the second control mode are initiated at a point of time which is almost the same as the moment of initiation of the regenerative operation of the second electric motor M2, that is, at a point of time before initiation of an increase of the braking force of the vehicle 8 as a result of the regenerative shift-down action.

When the step-variable shifting control portion 54 has received the regenerative shift-down action initiating command from the regenerative shift-down action implementing portion 72, the step-variable shifting control portion 54 applies shifting output commands to the hydraulic control unit 46, to selectively place the hydraulically operated frictional coupling devices (except the switching clutch C0 and switching brake B0) in the engaged state and/or released state to shift the automatic transmission portion 20 to the speed position selected by the regenerative shift-down action implementing portion 72.

Figure 9:
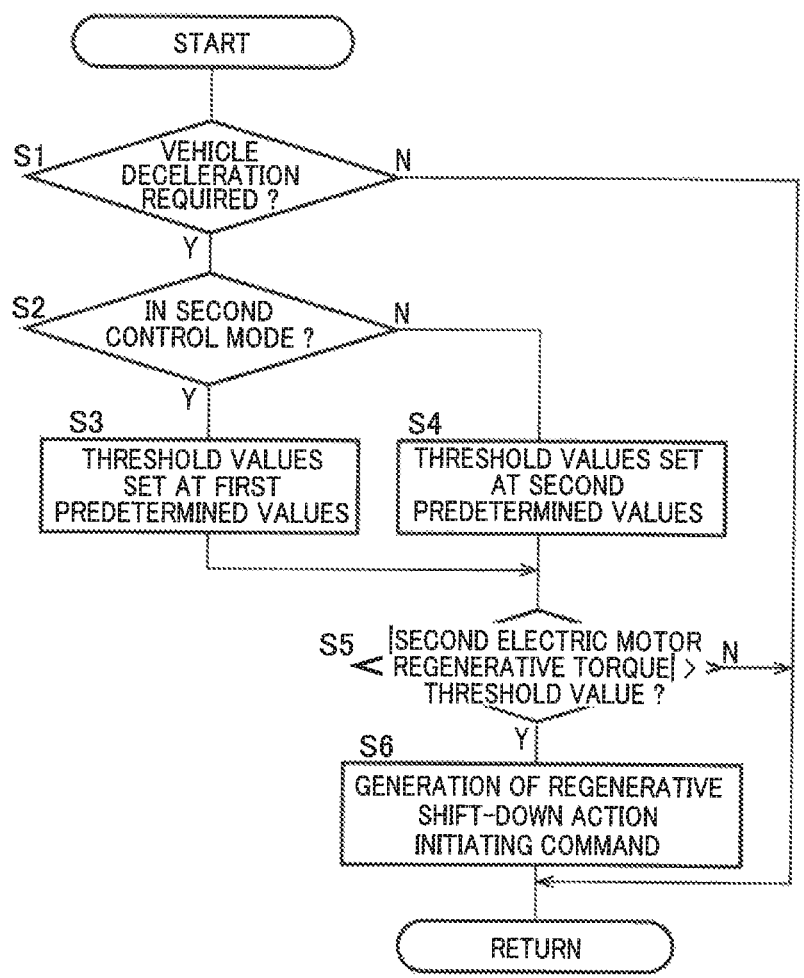
FIG. 9 is a flow chart illustrating a major part of a control routine executed by the electronic control device of FIG. 4.

FIG. 9 is the flow chart illustrating a major part of a control routine executed by the electronic control device 40 when the automatic transmission portion 20 is placed in one of the forward drive speed positions, for example, in the $4^{th}$-speed position or $3^{rd}$-speed position. The control routine is initiated with a step S1 corresponding to the functions of the deceleration requirement determining portion 68 and the automatic vehicle control portion 74, to determine whether the vehicle 8 is required to be decelerated. If a negative determination is obtained in the step S1, the present cycle of execution of the control routine is terminated. If an affirmative determination is obtained in the step S1, the control flow goes to a step S2 corresponding to the function of the shift-down action initiating condition setting portion 70, to determine whether the electronic control device 40 is placed in the second control mode in which acceleration and deceleration of the vehicle 8 are automatically adjusted not depending upon the operations of the vehicle operator to accelerate and decelerate the vehicle 8. This determination is made on the basis of the output signals of the auto-cruise-mode selector switch and the automatic vehicle control switch. If an affirmative determination is obtained in the step S2, the control flow goes to a step S3 corresponding to the function of the shift-down action initiating condition setting portion 70, to set the threshold value of the second electric motor regenerative torque $T_{m2r}$ used to determine the initiation of the regenerative shift-down action of the automatic transmission portion 20 during the regenerative decelerating run from the $4^{th}$-speed position to the $3^{rd}$-speed position while the vehicle speed V is in the range of the first amount of difference $\Delta V_{43(1)}$, or the initiation of the regenerative shift-down action of the automatic transmission portion 20 from the $3^{rd}$-speed position to the $2^{nd}$-speed position while the vehicle speed V is in the range of the first amount of difference $\Delta V_{32(1)}$. Described more specifically, the threshold value of the second electric motor regenerative torque $T_{m2r}$ is set at the first predetermined value $T_{43m2r(1)}$ or $T_{32m2r(1)}$ according to the regenerative shift-down boundary line map of FIG. 8, depending upon the presently established speed position of the automatic transmission portion 20 and the present vehicle speed V. If a negative determination is obtained in the step S2, the control flow goes to a step S4 also corresponding to the function of the shift-down action initiating condition setting portion 70, to set the threshold value of the second electric motor regenerative torque $T_{m2r}$ used to determine the initiation of the regenerative shift-down action of the automatic transmission portion 20 from the $4^{th}$-speed position to the $3^{rd}$-speed position while the vehicle speed V is in the range of the second amount of difference $\Delta V_{43(2)}$, or the initiation of the regenerative shift-down action of the automatic transmission portion 20 from the $3^{rd}$-speed position to the $2^{nd}$-speed position while the vehicle speed V is in the range of the second amount of difference $\Delta V_{32(2)}$. Described more specifically, the threshold value of the second electric motor regenerative torque $T_{m2r}$ is set at the second predetermined value $T_{43m2r(2)}$ or $T_{32m2r(2)}$ according to the regenerative shift-down boundary line map of FIG. 7, depending upon the presently established speed position of the automatic transmission portion 20 and the present vehicle speed V. The steps S3 and S4 are followed by a step S5 corresponding to the function of the regenerative shift-down action implementing portion 72, to determine whether the second electric motor regenerative torque $T_{m2r}$ has become larger than the threshold value set by the shift-down action initiating condition setting portion 70, namely, the first predetermined value $T_{43m2r(1)}$ or $T_{32m2r(1)}$ used in the second control mode, or the second predetermined value $T_{43m2r(2)}$ or $T_{32m2r(2)}$ used in the first control mode. If a negative determination is obtained in the step S5, the present cycle of execution of the control routine is terminated. If an affirmative determination is obtained in the step S5, the control flow goes to a step S6 also corresponding to the function of the regenerative shift-down action implementing portion 72, to apply the regenerative shift-down action initiating command to the step-variable shifting portion 54, for implementing the regenerative shift-down action of the automatic transmission portion 20, and the present cycle of execution of the control routine is terminated.

Figure 10:
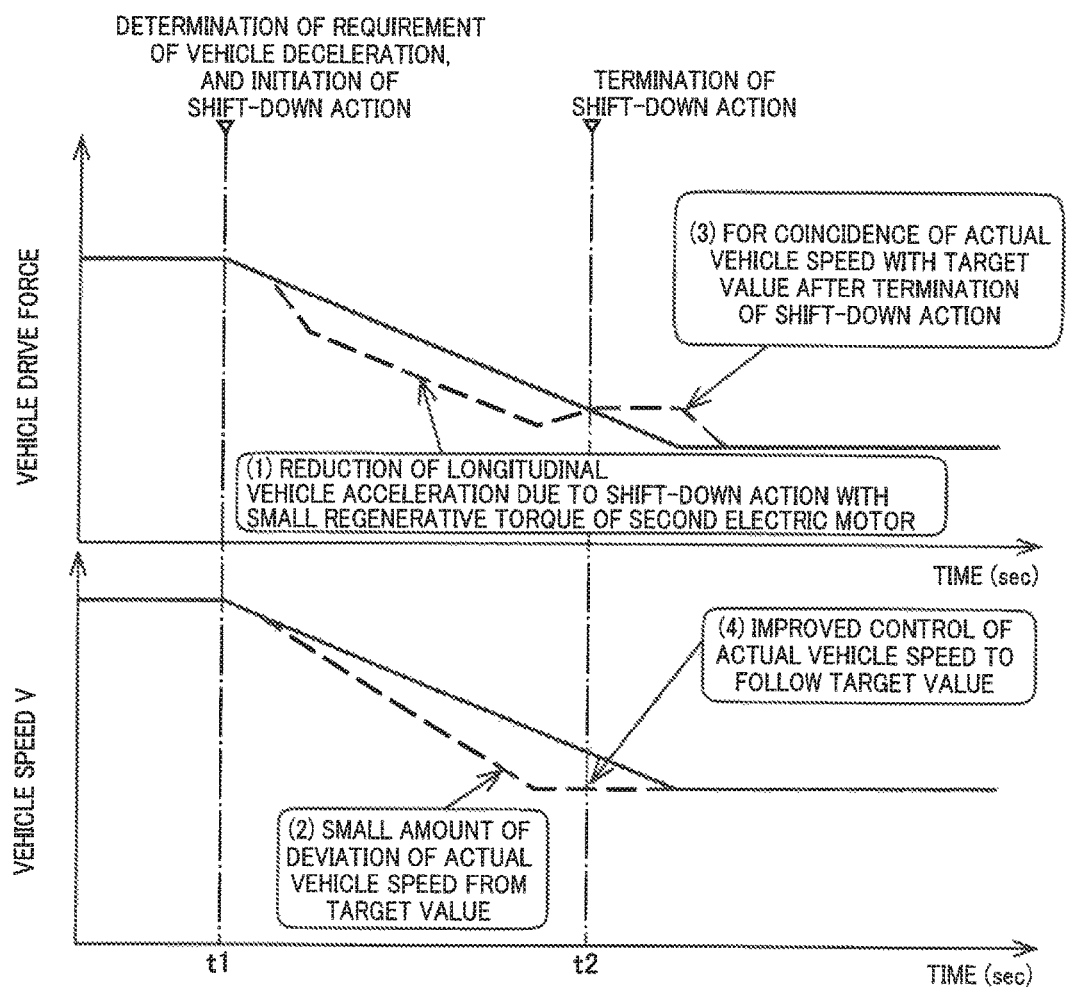
FIG. 10 is a time chart illustrating an example of the control operation of the electronic control device of FIG. 9 performed when a regenerative shift-down action of the automatic transmission portion from the $4^{th}$-speed or $3^{rd}$-speed position is implemented during the regenerative decelerating run of the vehicle of FIG. 1 in the second control mode in the form of an auto-cruise control mode, according to the regenerative shift-down boundary line map used in the second control mode.
Figure 11:
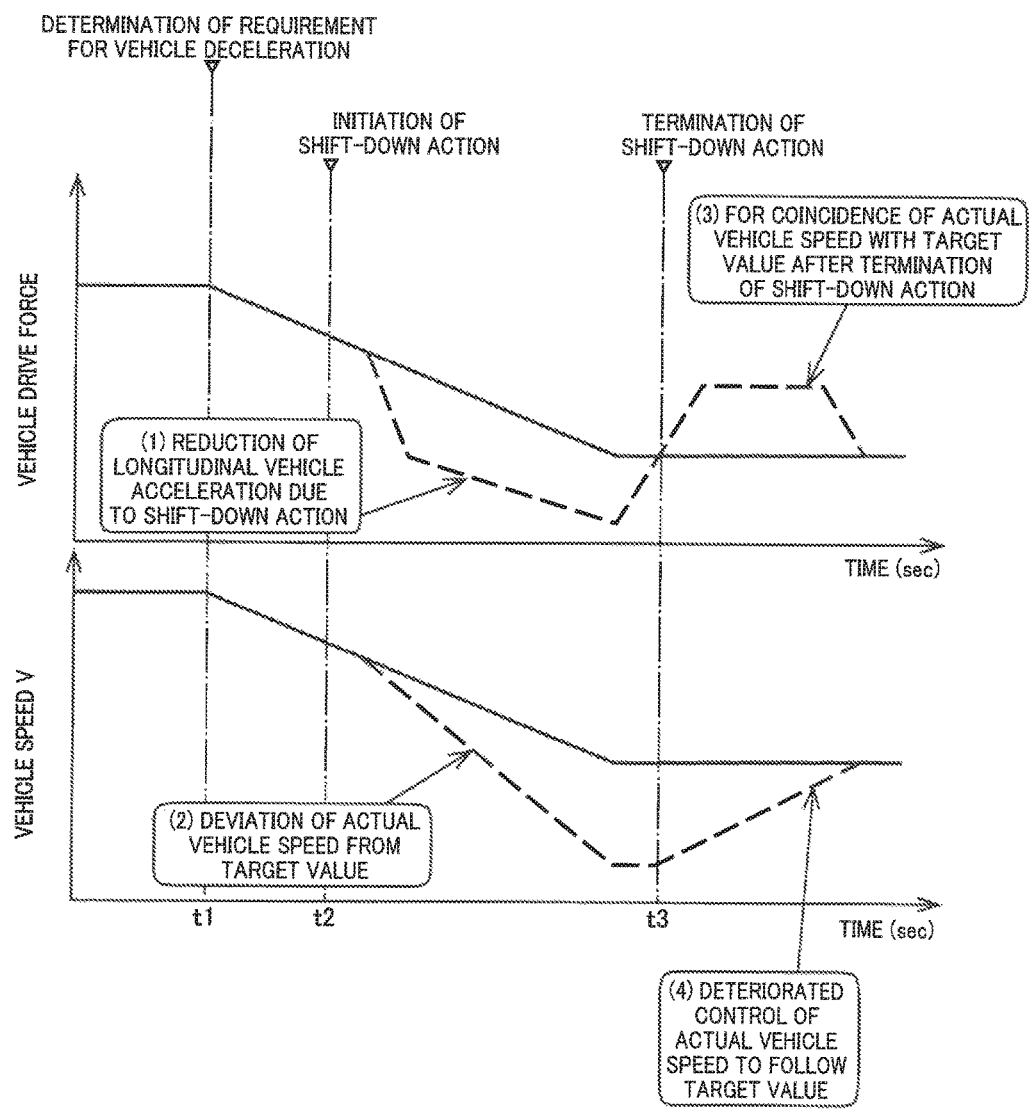
FIG. 11 is a time chart illustrating an example of a control operation of an electronic control device according to a comparative example performed when a regenerative shift-down action of the automatic transmission portion is implemented during the regenerative decelerating run of the vehicle of FIG. 1 in the second control mode in the form of the auto-cruise control mode, according to the regenerative shift-down boundary line map used in the first control mode in which the vehicle is accelerated and decelerated on the basis of operations by a vehicle operator to accelerate and decelerate the vehicle.

FIG. 10 is the time chart illustrating an example of the control operation of the electronic control device 40 performed when the regenerative shift-down action of the automatic transmission portion 20 from the $4^{th}$-speed or $3^{th}$-speed position is implemented during the regenerative decelerating run of the vehicle 8 in the second control mode, for example, in the auto-cruise control mode or fully automatic vehicle control mode, according to the regenerative shift-down boundary line map for the second control mode, namely, on the basis of the first predetermined value $T_{43m2r(3)}$ or $T_{32m2r(1)}$ used as the threshold value of the second electric motor regenerative torque $T_{m2r}$ to determine whether the regenerative shift-down action of the automatic transmission portion 20 should be implemented in the second control mode. It is noted that the vehicle drive force taken along the vertical axis in FIGS. 10 and 11 is a drive force acting on the drive wheels 38 of the vehicle 8. It is also noted that solid lines in FIGS. 10 and 11 represent target values of the vehicle drive force and the vehicle speed V, while broken lines represent actual values of the vehicle drive force and the vehicle speed V. In the example of FIG. 10 in which the regenerative shift-down boundary line map of FIG. 8 for the second control mode is used, the regenerative shift-down action is initiated while the second electric motor regenerative torque $T_{m2r}$ is comparatively small and while the vehicle speed V is comparatively high, that is, initiated at an earlier point of time than while the regenerative shift-down boundary line map of FIG. 7 for the first control mode is used. Namely, the regenerative shift-down action is initiated at a point of time which is almost the same as the moment of initiation of the regenerative operation of the second electric motor M2 (a point of time t1 indicated in FIG. 10) as a result of the determination of the requirement for deceleration of the vehicle 8. Accordingly, the amount of increase of variation of the vehicle braking force caused by the regenerative shift-down action is reduced, so that it is possible to reduce the amount of variation of the longitudinal acceleration G of the vehicle 8 caused by the increase of variation of the vehicle braking force due to the regenerative shift-down action during a time period from the moment of initiation (point of time t1) of the regenerative shift-down action to the moment of termination (point of time t2) of the regenerative shift-down action. As a result, the amount of deviation of the actual value of the vehicle speed V from the target value is reduced. In addition, the reduced amount of variation of the longitudinal acceleration G and the reduced amount of deviation of the actual vehicle speed V from its target value during the regenerative shift-down action permit an improvement of control of the actual vehicle speed V so as to follow its target value after termination of the regenerative shift-down action, by increasing the actual vehicle drive force to a value larger than the target value, after the moment of termination of the regenerative shift-down action, for the purpose of controlling the actual vehicle speed V so as to coincide with the target value.

FIG. 11 is the time chart illustrating a comparative example of the control operation of the electronic control device 40 performed when the regenerative shift-down action of the automatic transmission portion 20 from the $4^{th}$-speed or $3^{rd}$-speed position is implemented during the regenerative decelerating run of the vehicle 8 in the second control mode, for example, in the auto-cruise control mode, according to the regenerative shift-down boundary line map for the first control mode. In this comparative example, the regenerative shift-down action is initiated at a point of time which is delayed with respect to the point of time at which the regenerative shift-down action is initiated according to the regenerative shift-down boundary line map used in the second control mode. Accordingly, the regenerative shift-down action is implemented while the second electric motor regenerative torque $T_{m2r}$ is comparatively large, so that the amount of variation of the vehicle braking force is increased. As a result, the amount of variation of the longitudinal acceleration G of the vehicle 8 during a time period from the moment of initiation of the regenerative shift-down action (a point of time t2) to the moment of termination of the regenerative shift-down action (a point of time t3) is increased as compared with that while the regenerative shift-down action is implemented according to the regenerative shift-down boundary line map used in the second control mode.

The vehicle 8 is provided with the second electric motor M2 having an output member rotated together with the power transmitting member 18, and the automatic transmission portion 20 disposed in the power transmitting path between the second electric motor M2 and the drive wheels 38. In this type of vehicle 8 provided with the second electric motor M2 and the automatic transmission portion 20, it is difficult to accurately control synchronization of the second electric motor speed $N_{m2}$ while ensuring a target value of the vehicle braking force, even if the second electric motor regenerative torque $T_{m2r}$ is controlled so as to maintain the target value of the vehicle braking force during a regenerative shift-down action of the automatic transmission portion 20 while a regenerative operation of the second electric motor M2 is performed so as to generate a large regenerative torque. Accordingly, the vehicle braking force tends to vary, giving rise to a risk of generation of a shift-down shock of the automatic transmission portion 20. However, the electronic control device 40 according to the present embodiment of the invention is configured to set the shift-down action initiating condition during a regenerative decelerating run of the vehicle 8, according to the regenerative shift-down boundary line maps for the automatic transmission portion 20, and on the basis of the second electric motor regenerative torque $T_{m2r}$ and the vehicle running speed V. According to the regenerative shift-down boundary lines 3←4(1) and 2←3(1) used in the second control mode, the shift-down action initiating condition is set such that the regenerative shift-down action is initiated at a higher value of the vehicle speed V, than while the shift-down action initiating condition is set according to the regenerative shift-down boundary lines 3←4(2) and 2←3(2) used in the first control mode. In the second control mode such as the auto-cruise control mode, preceding-vehicle tracing control mode and fully automatic vehicle control mode, the regenerative shift-down action is initiated while the second electric motor regenerative torque $T_{m2r}$ is smaller than in the first control mode, so that it is possible to reduce the amount of increase of variation of the vehicle braking force caused by the regenerative shift-down action, and to reduce the amount of variation of the longitudinal acceleration G of the vehicle 8 during the regenerative shift-down action. Accordingly, it is possible to reduce a possibility of the vehicle operator feeling a discomfort with a shift-down shock of the automatic transmission portion 20 caused by the variation of the longitudinal acceleration G of the vehicle 8 as a result of the regenerative shift-down action of the automatic transmission portion 20 during the regenerative decelerating run of the vehicle 8 in the second control mode in which the vehicle operator tends to more sensitively feel the shift-down shock.

In addition, the vehicle 8 to be controlled by the electronic control device 40 according to the present embodiment is further provided with the engine 15 and the second electric motor M2 both serving as the drive power source, and a power transmitting/cutoff device (in the form of the first electric motor M1 and the differential-portion planetary gear set 24) provided to selectively disconnect the engine 15 from the above-described power transmitting path. During the regenerative decelerating run of the vehicle 8 in the second control mode in which a regenerative shift-down action of the automatic transmission portion 20 is initiated based on the shift-down action initiating condition including the regenerative shift-down boundary lines, the electronic control device 40 commands the power transmitting/cutoff device to disconnect the engine 15 from the power transmitting member 18 which is the input shaft of the automatic transmission portion 20. In the present vehicle 8 provided with the drive power source in the form of the engine 15 and the second electric motor M2, the amount of variation of the vehicle braking force caused by the regenerative shift-down action of the automatic transmission portion 20 during the regenerative decelerating run of the vehicle 8 can be reduced by an amount corresponding to the inertia force of the engine 15, by disconnecting the engine 15 from the power transmitting member 18 during the regenerative operation of the second electric motor M2. As a result, it is possible to reduce the possibility of the vehicle operator feeling a discomfort with the shift-down shock of the automatic transmission portion 20 caused by the variation of the longitudinal acceleration G of the vehicle 8 as a result of the regenerative shift-down action of the automatic transmission portion 20 during the regenerative decelerating run of the vehicle 8 in the second control mode in which the vehicle operator tends to more sensitively feel the shift-down shock of the automatic transmission portion 20 than in the first control mode.

The electronic control device 40 according to the present embodiment is configured such that the first amount of difference $\Delta V_{43(1)}$ between the threshold value of the vehicle speed V according to the regenerative shift-down boundary line 3←4(1) and that according to the regenerative shift-down boundary line 3←4(2) when the second electric motor regenerative torque $T_{m2r}$ is smaller than the second predetermined value $T_{43m2r(2)}$ is larger than an amount of difference $\Delta V_{43(1)}'$ ($=\Delta V_{43(1)}-\Delta V_{43(2)}$) between the threshold value of the vehicle speed V according to the regenerative shift-down boundary line 3←4(1) and that according to the regenerative shift-down boundary line 3←4(2) when the second electric motor regenerative torque $T_{m2r}$ is larger than the second predetermined value $T_{43m2r(2)}$ according to the regenerative shift-down boundary lines 3←4(2) and 3←4(1). The electronic control device 40 is further configured such that the first amount of difference $\Delta V_{32(1)}$ between the threshold value of the vehicle speed V according to the regenerative shift-down boundary line 2×3(1) and that according to the regenerative shift-down boundary line 2←3(2) when the second electric motor regenerative torque $T_{m2r}$ is smaller than the second predetermined value $T_{32m2r(2)}$ is larger than an amount of difference $\Delta V_{32(1)}'$ ($\Delta V_{32(1)}-\Delta V_{32(2)}$) between the threshold value of the vehicle speed V according to the regenerative shift-down boundary line 2←3(1) and that according to the regenerative shift-down boundary line 2←3(2) when the second electric motor regenerative torque $T_{m2r}$ is larger than the second predetermined value $T_{32m2r(2)}$ according to the regenerative shift-down boundary lines 2←3(2) and 2←3(1). Accordingly, the regenerative shift-down actions of the automatic transmission portion 20 during the regenerative decelerating run of the vehicle 8 are implemented at higher values of the vehicle speed V in the second control mode than in the first control mode. Accordingly, the regenerative shift-down actions are more easily implemented in the second control mode while the second electric motor regenerative torque $T_{m2r}$ is comparatively small, more specifically, smaller than the first predetermined value $T_{43m2r(1)}$ used for the shift-down action from the $4^{th}$-speed position to the $3^{rd}$-speed position, or the first predetermined value $T_{32m2r(1)}$ used for the shift-down action from the $3^{rd}$-speed position to the $2^{nd}$-speed position. Further, the amount of difference $\Delta V_{43(1)}'$ between the threshold values of the vehicle speed V according to the regenerative shift-down boundary lines 3←4(1) and 3←4(2) in the respective second and first control modes while the second electric motor regenerative torque $T_{m2r}$ is larger than the second predetermined value $T_{43m2r(2)}$ is held comparatively small. Similarly, the amount of difference $\Delta V_{32(1)}'$ between the threshold values of the vehicle speed V according to the regenerative shift-down boundary lines 2←3(1) and 2←3(2) in the respective second and first control modes while the second electric motor regenerative torque $T_{m2r}$ is larger than the second predetermined value $T_{32m2r(2)}$ is held comparatively small. Thus, the regenerative shift-down boundary line maps are formulated to improve the fuel economy of the vehicle 8 while the second electric motor regenerative torque $T_{m2r}$ is larger than the second predetermined value $T_{43m2r(2)}$ and $T_{32m2r(2)}$.

Second Embodiment

Another embodiment of the present invention will be described next. It is to be understood that the same reference signs as used in the preceding first embodiment will be used to identify substantially the same functional elements, which will not be described redundantly.

In the present embodiment, a hybrid vehicle 80 (hereinafter referred to as "vehicle 80") is also provided with the electronic control device 40 provided for the vehicle 8 in the first embodiment. This vehicle 80 includes a hybrid vehicular power transmitting system 82 (hereinafter referred to "power transmitting system 82") which is different from the power transmitting system 10 provided in the vehicle 8. Only aspects of the power transmitting system 82 that are different from those of the power transmitting system 10 will be described by reference to FIGS. 12 and 13.

Figure 12:
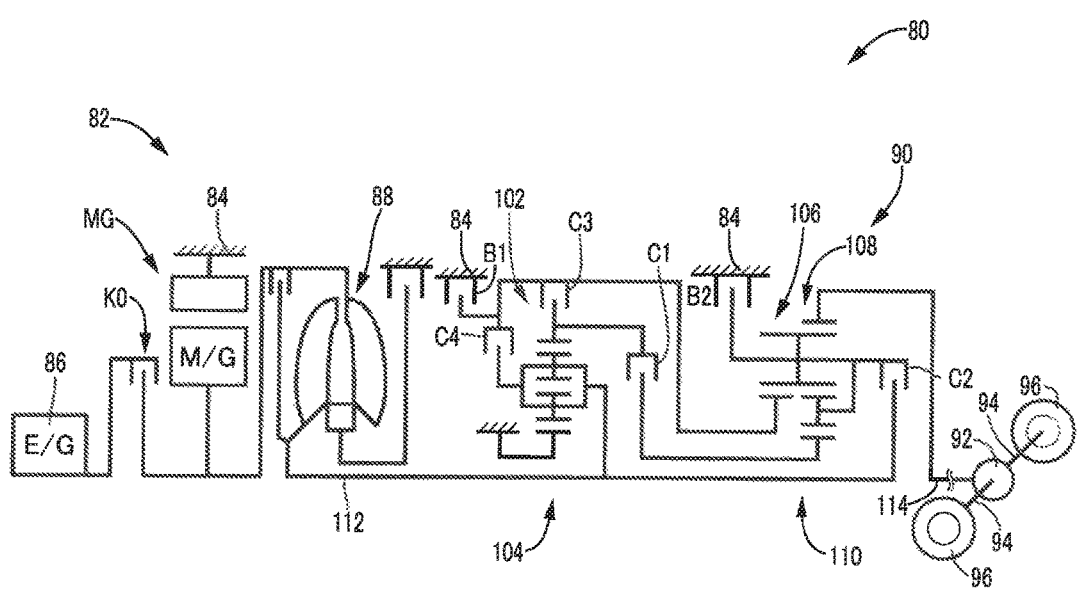
FIG. 12 is a schematic view showing another arrangement of a vehicular power transmitting system between an engine and drive wheels of a vehicle according to another embodiment of this invention, which is controlled by the electronic control device of FIG. 4.

FIG. 12 is the schematic view showing the arrangement of a power transmitting path between an engine 86 and drive wheels 96 of the vehicle 80. It is noted that lower halves of a torque converter 88 and an automatic transmission 90, which are constructed symmetrically with respect to their axes, are not shown in FIG. 12. As shown in FIG. 12, the power transmitting system 82 includes: a clutch K0; an electric motor MG; the above-indicated torque converter 88; and the above-indicated automatic transmission 90. The clutch K0, electric motor MG, torque converter 88 and automatic transmission 90 are coaxially disposed on a common axis in a transmission casing 84 (hereinafter referred to as "casing 84") functioning as a stationary member attached to a body of the vehicle 80 by bolts and nuts or the like, in the order of description as seen from the side of the engine 86. The power transmitting system 82 further includes a differential gear device 92 connected to an output rotary member in the form of an output shaft of the automatic transmission 90, and, a pair of drive axles 94 connected to the differential gear device 92. The automatic transmission 90 is disposed in a power transmitting path between the electric motor MG and a pair of drive wheels 96. The vehicle 80 provided with this power transmitting system 82 constructed as described above is typically of an FR vehicle (front-engine rear-drive vehicle) type. In the power transmitting system 82, a drive force of the engine 86 is transmitted to the pair of drive wheels 96 through the clutch K0, torque converter 88, automatic transmission 90, differential gear device 92 and pair of drive axles 94, while the clutch K0 is placed in its engaged state. It is noted that the electric motor MG corresponds to an electric motor to be controlled by the vehicle control apparatus according to the invention in the form of the electronic control device 40, while the automatic transmission 90 corresponds to a step-variable transmission to be controlled by the vehicle control apparatus. It is also noted that the clutch K0 functions as a power transmitting/cutoff device that is switched to connect or disconnect the engine 86 to or from the power transmitting path between the electric motor MG and the pair of drive wheels 96.

The automatic transmission 90 includes a first transmission portion 104 principally constituted by a double-pinion type first planetary gear set 102, and a second transmission portion 110 principally constituted by a single-pinion type second planetary gear set 106 and a double-pinion type third planetary gear set 108 in the transmission casing 84. The first and second transmission portions 104 and 110 are coaxially disposed on a common axis. The automatic transmission 90 has an input shaft 112 and an output shaft 114, and is configured to transmit a rotary motion of the input shaft 112 to the output shaft 114, such that a speed ratio of rotating speeds of the input and output shafts 112 and 114 is variable in steps. The input shaft 112 corresponds to an input rotary member of the automatic transmission 90, which is connected to a turbine impeller of the torque converter 88. The output shaft 114 corresponds to an output rotary member of the automatic transmission 90, a rotary motion of which is transmitted to the pair of drive wheels 96 through the differential gear device 92 and the pair of drive axles 94, to drive the drive wheels 96.

The automatic transmission 90 incorporates a first clutch C1, a second clutch C2, a third clutch C3, a fourth clutch C4, a first brake B1 and a second brake B2. FIG. 13 is the table indicating shifting actions of the automatic transmission 90, in relation to different combinations of operating states of coupling devices (coupling elements) for establishing respective speed positions of the automatic transmission 90. In FIG. 13, "o" indicates the engaged state of the coupling devices, while a blank space indicates the released state of the coupling devices.

When the automatic vehicle control portion 74 of the electronic control device 40 has determined the requirement for deceleration of the vehicle 80 and commands the hybrid control portion 52 to implement a regenerative operation of the electric motor MG, the clutch K0 is brought into its released state to disconnect the engine 86 from the above-indicated power transmitting path. As a result of disconnection of the engine 86 from the power transmitting path during a regenerative decelerating run of the vehicle 80, an inertia of the engine 86 acts on the drive wheels 96 in a direction opposite to the direction of a regenerative braking force generated by the regenerative operation of the electric motor MG. When the shift-down action initiating condition setting portion 70 of the electronic control device 40 makes the determination of establishment of the second control mode in which the vehicle 80 is controlled not depending upon the operations by the vehicle operator to accelerate and decelerate (brake) the vehicle 80, in the ON state of the auto-cruise selector switch or the automatic-drive-mode selector switch, after the determination of the requirement for deceleration of the vehicle 8 by the automatic vehicle control portion 74, the shift-down action initiating condition setting portion 70 selects the regenerative shift-down boundary line map used in the second control mode, so that a regenerative shift-down action of the automatic transmission 90 is initiated at a higher value of the vehicle speed V in the second control mode than in the first control mode, during a regenerative decelerating run of the vehicle 80 with the regenerative operation of the electric motor MG while the engine 86 is disconnected from the above-indicated power transmitting path.

As described above, the present second embodiment has substantially the same advantages as the first embodiment. Further, the second embodiment has not only an advantage that the regenerative shift-down actions of the automatic transmission 90 are initiated in the second control mode before an increase of variation of the regenerative braking force acting on the drive wheels 96 as a result of the regenerative shift-down action, but also an advantage that the amount of variation of the regenerative braking force is reduced by an amount corresponding to the inertia of the engine 86 acting on the drive wheels 96 while the engine 86 is disconnected from the power transmitting path. Accordingly, it is possible to reduce a possibility of the vehicle operator feeling a discomfort with the shift-down shock of the automatic transmission 90 caused by the variation of the longitudinal acceleration G of the vehicle 80 during the regenerative shift-down action of the automatic transmission 90 in the regenerative decelerating run of the vehicle 80 in the second control Mode in which the vehicle operator tends to more sensitively feel the regenerative shift-down action.

While the preferred embodiments of this invention have been described in detail by reference to the drawings, it is to be understood that the invention may be otherwise embodied, without departing from the spirit of the invention.

According to the electronic control device 40 in the first embodiment, the regenerative shift-down boundary line maps are formulated such that the regenerative shift-down action of the automatic transmission portion 20 from the $4^{th}$-speed position to the $3^{rd}$-speed position is initiated when the second electric motor regenerative torque $T_{m2r}$ has become larger than the second predetermined value $T_{43m2r(2)}$ in the first control mode or the first predetermined value $T_{43m2r(1)}$ in the second control mode, and such that the regenerative shift-down action of the automatic transmission portion 20 from the $3^{rd}$-speed position to the $2^{nd}$-speed position is initiated when the second electric motor regenerative torque $T_{m2r}$ has become larger than the second predetermined value $T_{32m2r(2)}$ in the first control mode or the first predetermined value $T_{32m2r}$w in the second control mode. However, the regenerative shift-down boundary line maps are not limited to those described with respect to the first embodiment. For instance, the regenerative shift-down boundary line map may be formulated such that the regenerative shift-down actions are initiated when the absolute value of the output shaft torque $T_{out}$ has become larger than predetermined threshold values.

In the first embodiment, the electronic control device 40 is used for controlling the hybrid vehicle 8 of a so-called "parallel running" type, which includes: the differential portion 11 provided with the differential-portion planetary gear set 24 having the carrier CA0 connected to the engine 15, and the sun gear S0 connected to the first electric motor M1; and the automatic transmission portion 20 constructed to receive a drive force through its power transmitting member 18 connected to the ring gear R0 of the differential-portion planetary gear set 24, and wherein the engine torque $T_e$ and the second electric motor torque $T_{m2}$ are transmitted to the automatic transmission portion 20 while a reaction force is generated by the first electric motor M1. In the second embodiment, the electronic control device 40 is used for controlling the hybrid vehicle 80, which includes: the drive power source in the form of the engine 86 and the electric motor MG; the automatic transmission 90 disposed in the power transmitting path between the electric motor MG and the drive wheels 96; and the clutch K0 provided to selectively disconnect the engine 86 from the above-indicated power transmitting path. However, the electronic control device 40 may be used for controlling other types of vehicle, for example, a hybrid vehicle of a so-called "series running" type, which includes: an engine; an automatic transmission portion; a first electric motor operated as an electric generator with a drive force of the engine; and a second electric motor operatively connected to an input shaft of the automatic transmission portion and operated with an electric energy generated by the first electric motor, to generate a drive torque to be transmitted to the input shaft of the automatic transmission portion to drive vehicle drive wheels, and wherein only the drive torque of the second electric motor is applied to the input shaft of the automatic transmission portion. Further, the electronic control device 40 may be used for controlling an electric vehicle wherein the drive power source does not include a combustion engine, i.e., consists solely of an electric motor(s) operatively connected to an input shaft of an automatic transmission portion.

In the illustrated first embodiment, the automatic vehicle control portion 74 is configured to determine whether the vehicle 8 is required to be decelerated (braked) when the determination as to whether the roadway is jammed or estimated to be jammed is made on the basis of VICS information. However, the determination of requirement for deceleration of the vehicle 8 need not be based on the VICS information, as long as this determination is possible in the second control mode. For instance, the VICS information may be replaced by similar roadway traffic information which includes information on roadway jamming.

It is to be understood that the embodiments and modifications described above are given for illustrative purpose only, and that the present invention may be embodied with various other changes and improvements which may occur to those skilled in the art, without departing from the spirit of the invention.

NOMENCLATURE OF ELEMENTS

8, 80: Vehicle (Electric vehicle)
15: Engine
20: Automatic transmission portion (Step-variable transmission)
24: Differential-portion planetary gear set (Power transmitting/cutoff device)
38, 96: Drive wheels
40: Electronic control device (Vehicle control apparatus)
86: Engine
90: Automatic transmission (Step-variable transmission)
K0: Clutch (Power transmitting/cutoff device)
M1: First electric motor (Power transmitting/cutoff device)
M2: Second electric motor (Electric motor)

What is claimed is:

1. A control apparatus for an electric vehicle provided with an electric motor serving as a drive power source, and a step-variable transmission disposed in a power transmitting path between the electric motor and drive wheels, the control apparatus comprising:
a microcomputer configured to:
control the vehicle in a first control mode in which acceleration and deceleration of the vehicle are controlled based on operations by an operator of the vehicle to accelerate and decelerate the vehicle;
control the vehicle in a second control mode in which the acceleration and the deceleration of the vehicle are automatically adjusted according to a target running state of the vehicle, irrespective of the operations by the operator; and
set a shift-down action initiating condition for initiating a shift-down action of the step-variable transmission during a regenerative decelerating run of the vehicle, according to a torque-related value related to a regenerative torque generated by the electric motor, and a running speed of the vehicle, wherein
the shift-down action initiating condition is set such that the shift-down action is initiated at a higher value of the running speed of the vehicle during the regenerative decelerating run in the second control mode, than in the first control mode.

2. The control apparatus according to claim 1, wherein:
the electric vehicle is a hybrid vehicle which is further provided with:
an engine also serving as the drive power source, and
a power transmitting/cutoff device operable to disconnect the engine from the power transmitting path; and
the power transmitting/cutoff device is operated to disconnect the engine from the power transmitting path during the regenerative decelerating run of the vehicle in the second control mode.

3. The control apparatus according to claim 2, wherein:
a difference between the shift-down action initiating condition in the first control mode and the second control mode when the torque-related value is smaller than a threshold has a first difference amount;
a difference between the shift-down action initiating condition in the first control mode and the second control mode when the torque-related value is larger than the threshold has a second difference amount; and
the first difference amount is larger than the second difference amount.

4. The control apparatus according to claim 3, wherein the second control mode is selected from among an auto-cruise control mode, a preceding-vehicle tracing control mode, and a fully automatic vehicle control mode in which acceleration, deceleration and steering of the vehicle are automatically controlled.

5. The control apparatus according to claim 2, wherein the second control mode is selected from among an auto-cruise control mode, a preceding-vehicle tracing control mode, and a fully automatic vehicle control mode in which acceleration, deceleration and steering of the vehicle are automatically controlled.

6. The control apparatus according to claim 1, wherein:
a difference between the shift-down action initiating condition in the first control mode and the second control mode when the torque-related value is smaller than a threshold has a first difference amount;
a difference between the shift-down action initiating condition in the first control mode and the second control mode when the torque-related value is larger than the threshold has a second difference amount; and
the first difference amount is larger than the second difference amount.

7. The control apparatus according to claim 6, wherein the second control mode is selected from among an auto-cruise control mode, a preceding-vehicle tracing control mode, and a fully automatic vehicle control mode in which acceleration, deceleration and steering of the vehicle are automatically controlled.

8. The control apparatus according to claim 1, wherein the second control mode is selected from among an auto-cruise control mode, a preceding-vehicle tracing control mode, and a fully automatic vehicle control mode in which acceleration, deceleration and steering of the vehicle are automatically controlled.

9. A method of controlling an electric vehicle provided with an electric motor serving as a drive power source and a step-variable transmission disposed in a power transmitting path between the electric motor and drive wheels, the method comprising:

controlling the vehicle in a first control mode in which acceleration and deceleration of the vehicle are controlled based on operations by an operator of the vehicle to accelerate and decelerate the vehicle;

controlling the vehicle in a second control mode in which the acceleration and the deceleration of the vehicle are automatically adjusted according to a target running state of the vehicle, irrespective of the operations by the operator; and setting a shift-down action initiating condition for initiating a shift-down action of the step-variable transmission during a regenerative decelerating run of the vehicle, according to a torque-related value related to a regenerative torque generated by the electric motor, and a running speed of the vehicle, wherein the shift-down action initiating condition is set such that the shift-down action is initiated at a higher value of the running speed of the vehicle during the regenerative decelerating run in the second control mode, than in the first control mode.

* * * * *